(12) United States Patent
Hollinrake et al.

(10) Patent No.: US 6,874,582 B2
(45) Date of Patent: Apr. 5, 2005

(54) PLOW HITCH FOR VEHICLE

(75) Inventors: Mark S. Hollinrake, Marion, IA (US);
Mary T. Goos, Masonville, IA (US);
Wade J. Burken, Manchester, IA (US)

(73) Assignee: Henderson Manufacturing Company, Manchester, IA (US)

( * ) Notice: Subject to any disclaimer, the term of this patent is extended or adjusted under 35 U.S.C. 154(b) by 24 days.

(21) Appl. No.: 10/236,550

(22) Filed: Sep. 6, 2002

(65) Prior Publication Data

US 2004/0045726 A1 Mar. 11, 2004

(51) Int. Cl.$^7$ .............................................. A01B 51/00
(52) U.S. Cl. ..................... 172/272; 172/273; 172/817; 172/245; 37/231; 37/266
(58) Field of Search ........................ 172/272, 273, 172/275, 817, 245, 911; 37/231, 234, 236, 232, 264, 266

(56) References Cited

U.S. PATENT DOCUMENTS

| 3,659,362 | A | * | 5/1972 | Bell | 37/231 |
|---|---|---|---|---|---|
| 3,760,883 | A | * | 9/1973 | Birk | 172/273 |
| 3,793,752 | A | * | 2/1974 | Snyder | 37/234 |
| 3,987,562 | A | * | 10/1976 | Deen et al. | 37/231 |
| 5,346,018 | A | * | 9/1994 | Koster | 172/47 |
| 5,815,956 | A | * | 10/1998 | Lavin et al. | 37/241 |
| 6,178,669 | B1 | * | 1/2001 | Quenzi et al. | 37/231 |
| 6,711,837 | B2 | * | 3/2004 | Bloxdorf et al. | 37/231 |

* cited by examiner

*Primary Examiner*—Robert E. Pezzuto
*Assistant Examiner*—Alexandra K. Pechhold
(74) *Attorney, Agent, or Firm*—Leydig, Voit & Mayer, Ltd.

(57) ABSTRACT

A hitch for hitching a plow to a vehicle. The hitch includes a vehicle portion and a plow portion. The vehicle portion includes a mounting member having a substantially planar face. The plow can be pivotally mounted to the plow portion of the hitch. The plow portion of the hitch can be removably mounted to the vehicle portion of the hitch. The plow portion can include a pair of clamping members with one clamping member being movable with respect to the other clamping member. The plow portion can also include a lift assembly for moving the plow between a plowing position and an elevated position.

50 Claims, 18 Drawing Sheets

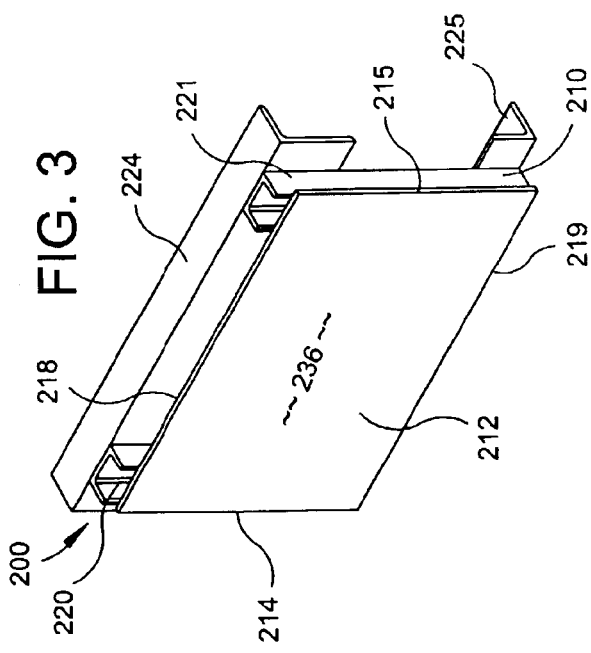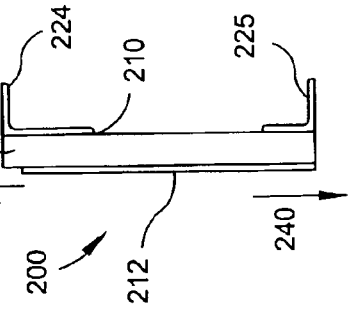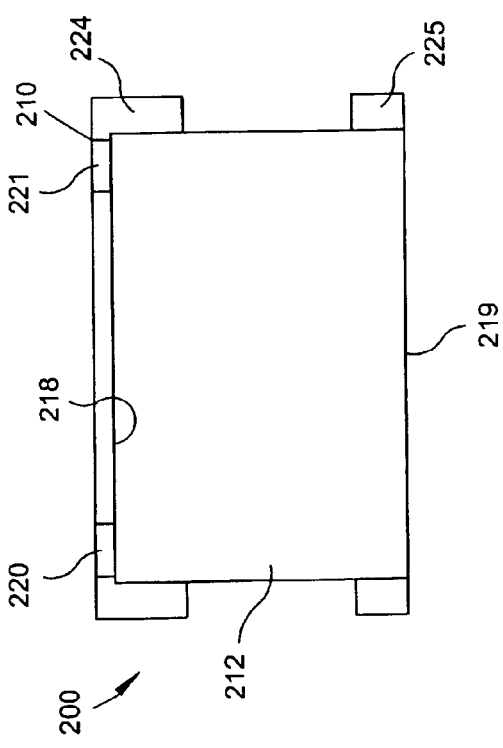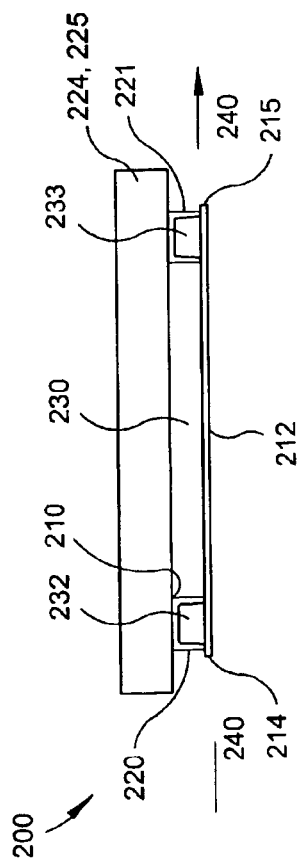

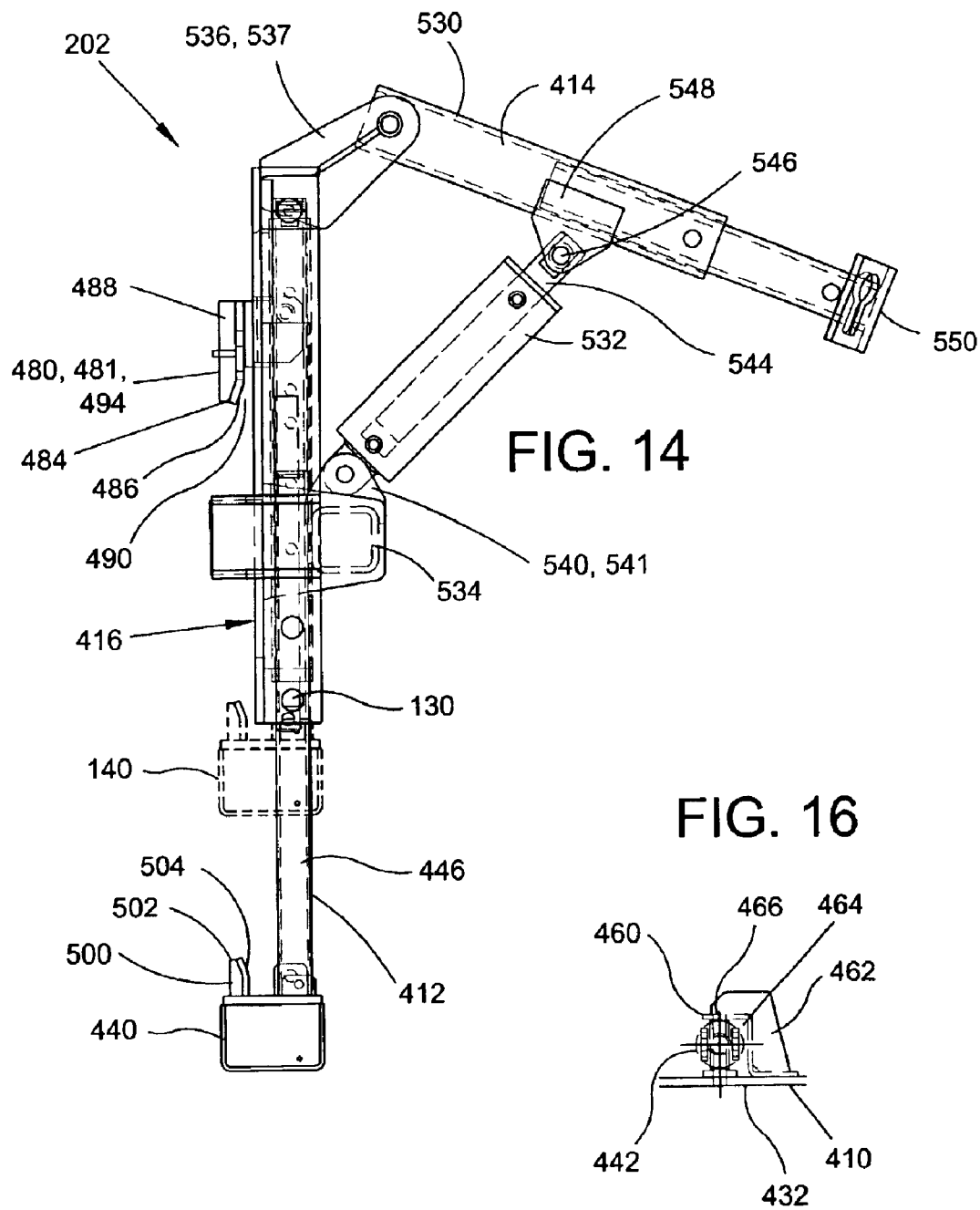

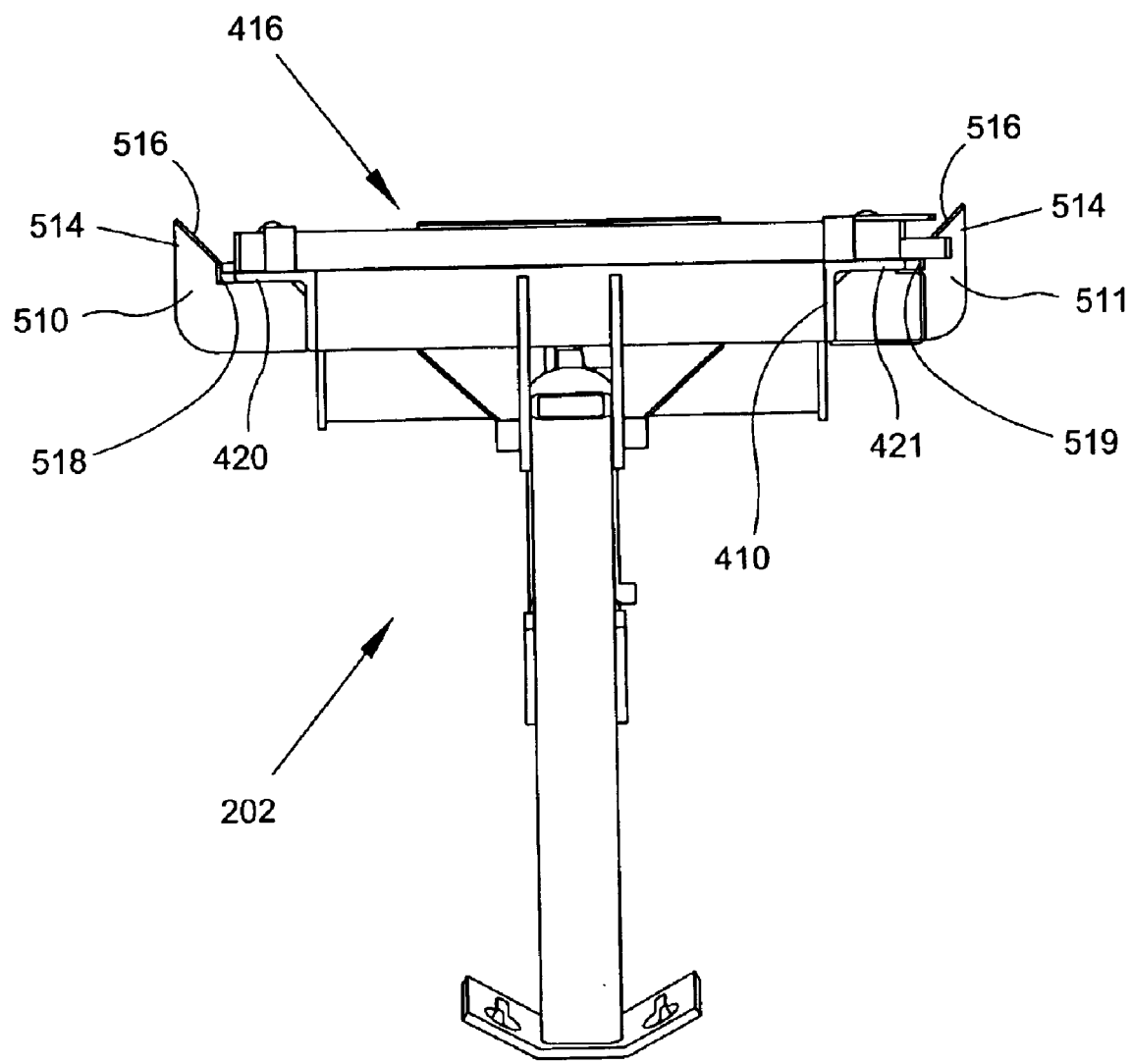

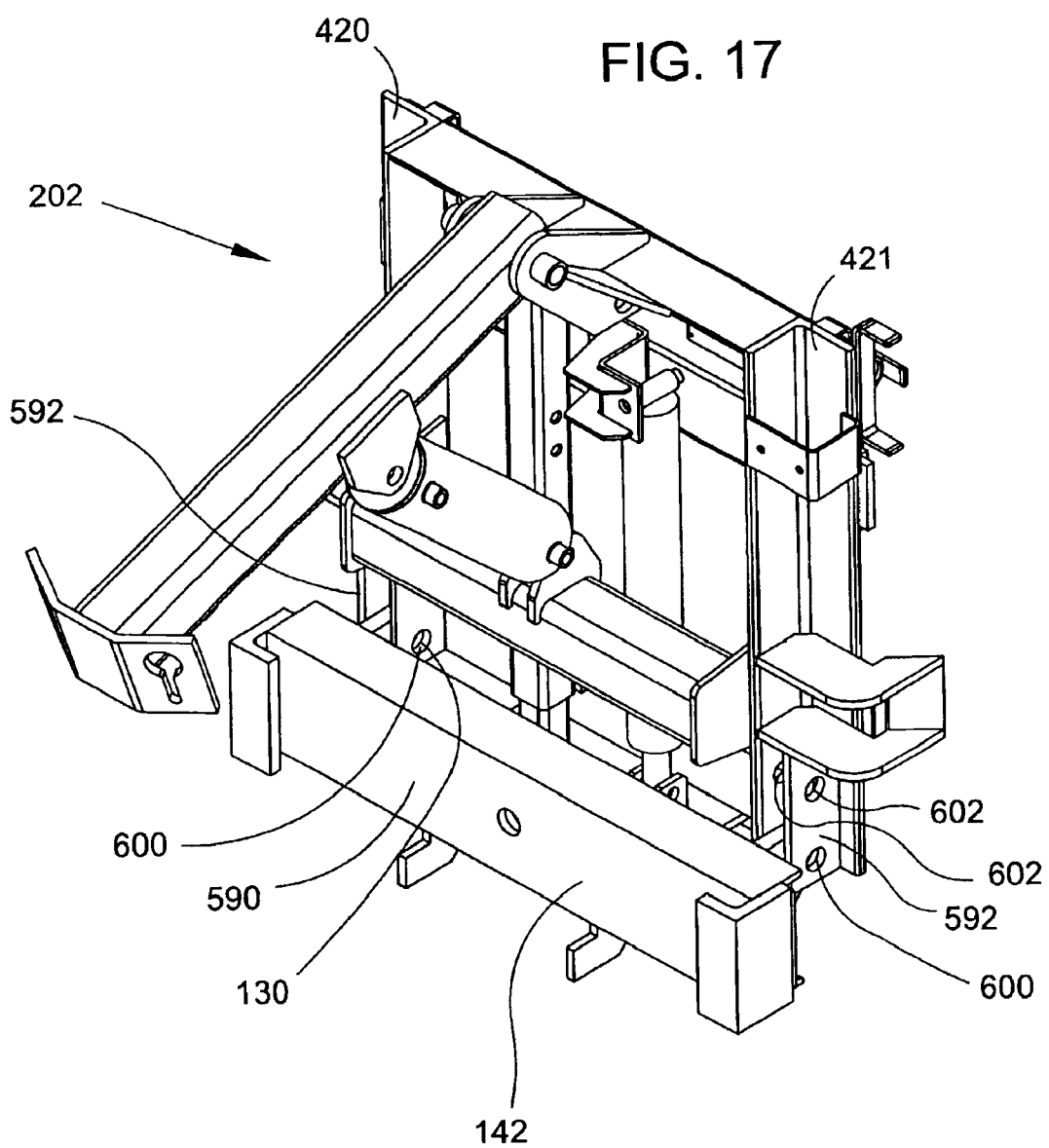

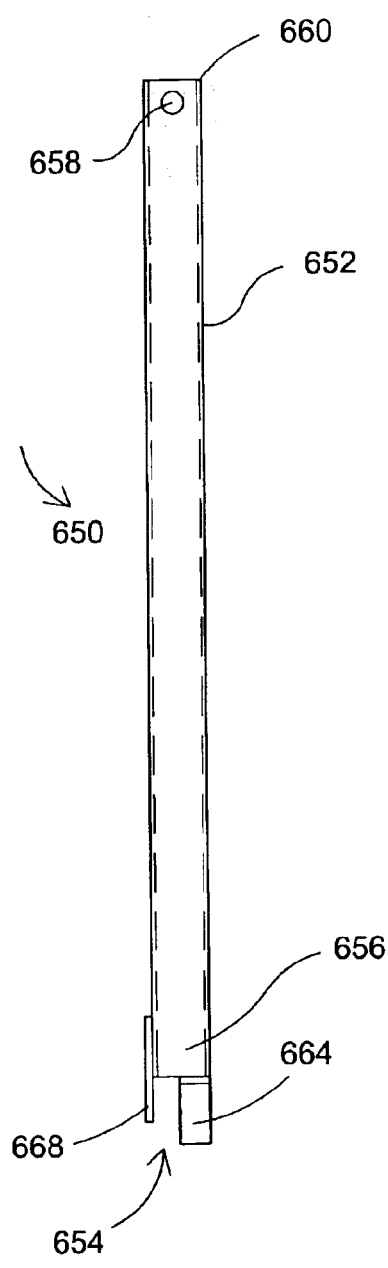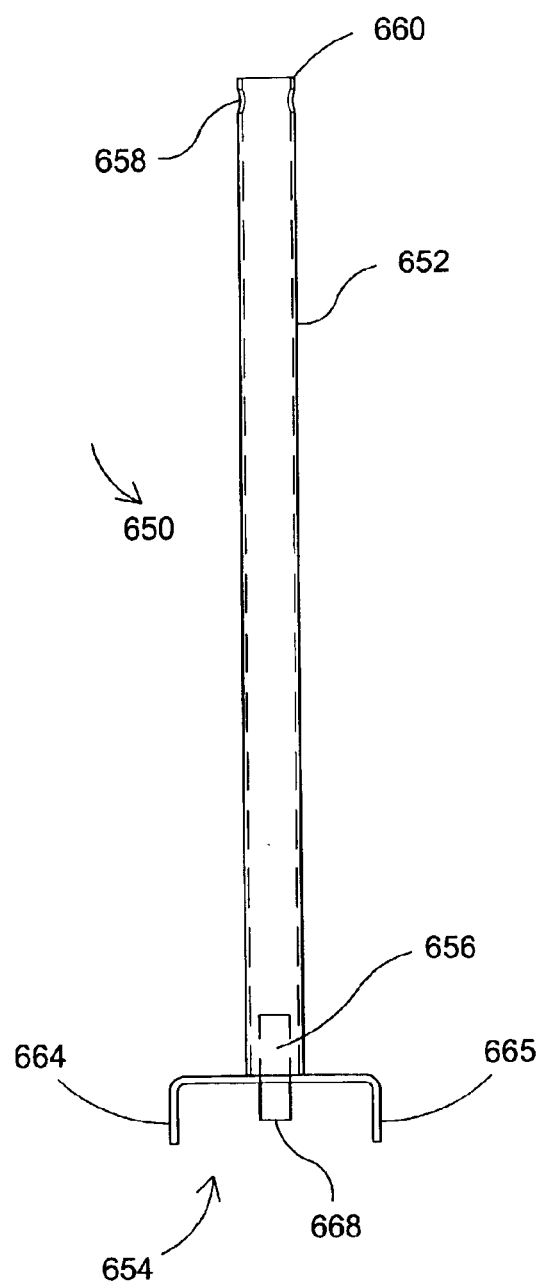

PLOW HITCH FOR VEHICLE

FIELD OF THE INVENTION

The present invention relates to a plow hitch in general, and more particularly to a hitch assembly for mounting a plow to a vehicle.

BACKGROUND OF THE INVENTION

To quickly and efficiently remove large amounts of snow from a surface, a snowplow is often mounted to a vehicle and moved along the surface to displace any snow accumulated thereon. Many municipalities, for example, employ a fleet of vehicles equipped with large snowplows for snow removal from city streets. However, when not in use, it is often desirable to remove the snowplow from the vehicle. A number of different hitch designs have been developed to removably mount a snowplow to a vehicle.

In many of these designs, a part of the hitch typically remains attached to the vehicle after removal of the plow from the vehicle. The part remaining on the vehicle generally include arms or other protrusions that project from the vehicle to engage the plow. When the plow is unhitched, the protrusions can be highly dangerous in that, in the event of a collision, the protrusions can worsen the damage caused by the collision and increase the likelihood of injury or even death to the occupants of the struck vehicle.

Conventional hitches can also obstruct access to the engine compartment under the hood of the vehicle, thereby complicating the routine maintenance of the vehicle.

Another disadvantage often associated with conventional hitch designs is the complexity and effort required to hitch and unhitch the plow to the vehicle. Often, a team of men is required to carry out the operation of aligning and hitching the snowplow to the vehicle. Additionally, because of the weight of the equipment involved, the hitching operation itself poses a danger to the operators.

SUMMARY OF THE INVENTION

The present invention provides a hitch for mounting a plow to a vehicle that includes a vehicle portion and a plow portion. The vehicle portion can be mounted to the vehicle. The vehicle portion can include a mounting member that has a substantially planar face. The mounting member defines a distal end having a flat surface which can extend from the front of the vehicle. The plow portion can be provided to support the plow. The plow portion can include a frame and a movable member which can be movable with respect to the frame. The movable member can have a clamping member which is adjustable to engage the mounting member of the vehicle portion for removably mounting the plow portion thereto. The frame of the plow portion can include a stationary clamping member which can be cooperatively arranged with the clamping member disposed on the movable member to retentively engage the mounting member of the vehicle portion.

The movable member of the plow portion can include a cylinder, a leg, and a base. The cylinder can be pivotally mounted to the frame and the base. The cylinder can include a movable piston and be operable to selectively move the base. The clamping member can extend from the base. The leg can be pivotally mounted to the frame and the base. The leg can include a tube and a rod with the rod being movable with respect to the tube. The leg can be in spaced relationship with respect to the cylinder.

The plow can be a plow assembly which includes a moldboard, a plow frame, and a biasing assembly. The plow frame can be pivotally mounted to the plow portion of the hitch assembly. The moldboard can be mounted to the plow frame, and the biasing assembly can be disposed between the moldboard and the plow frame. The plow portion of the hitch assembly can include a lift assembly for selectively moving the plow assembly.

When unhitched from the vehicle, the plow portion and the connected plow assembly can stand in a storage position upon a surface by way of the extended movable member and the moldboard. To maintain the plow portion and the plow assembly in the storage position, a brace can be placed between the plow portion and the plow frame.

The present invention provides a hitch for mounting a plow to a vehicle that can be readily used, allowing easy hitching and unhitching operations. Advantageously, the vehicle portion can be configured such that no component thereof protrudes beyond the mounting plate, thereby presenting a substantially flush distal end.

The features of the present invention will become apparent to one of ordinary skill in the art upon reading the detailed description, in conjunction with the accompanying drawings, provided herein.

BRIEF DESCRIPTION OF THE DRAWINGS

FIG. 3 is a perspective view of a vehicle portion of the hitch assembly of FIG. 1.

FIG. 4 is a front elevational view of the vehicle portion of FIG. 3.

FIG. 5 is a side elevational view of the vehicle portion of FIG. 3.

FIG. 6 is a top plan view of the vehicle portion of FIG. 3.

FIG. 14 is a side elevational view of the plow portion of FIG. 10, illustrating a movable jack stand shown in an extended position in full lines and in a retracted position in phantom lines.

FIG. 15 is a top plan view of the plow portion of FIG. 10.

FIG. 16 is a fragmentary, cross-sectional view of the plow portion taken along line 16—16 in FIG. 13.

FIG. 17 is a front perspective view of the plow portion of FIG. 10 with a portion of a plow frame of the plow mounted thereto.

FIG. 20 is a side elevational view of the brace of FIG. 19.

FIG. 21 is a front elevational view of the brace of FIG. 19.

DETAILED DESCRIPTION OF EMBODIMENTS OF THE INVENTION

In accordance with the teachings of the present invention, there is provided a hitch assembly for mounting a plow to a vehicle. The hitch assembly includes a vehicle portion mountable to the vehicle and a plow portion removably mountable to the vehicle portion. The vehicle portion includes a mounting member, preferably in the form of a flat plate which projects from the vehicle, presenting a substantially planar distal end surface. The plow portion can be mounted to a plow and can be used to removably mount the plow to the vehicle. The plow portion can include a frame and a movable member depending therefrom which can move over a range of travel between a retracted position and an extended position. The plow portion can include a pair of clamping projections with one of the clamping projections disposed on the movable member and the other disposed on the frame such that moving the movable member moves the clamping projections with respect to each other.

To mount the plow portion to the vehicle, the plow portion can be placed adjacent the vehicle portion. The movable member can be moved to adjust the position of the clamping projections with respect to each other. The vehicle portion can be positioned and the clamping projections can be adjusted such that the clamping projections retentively engage the mounting member of the vehicle portion, thereby mounting the plow to the vehicle. To remove the plow, the movable member can be extended away from the vehicle portion to disengage the clamping projections from the mounting member.

Figure 1:
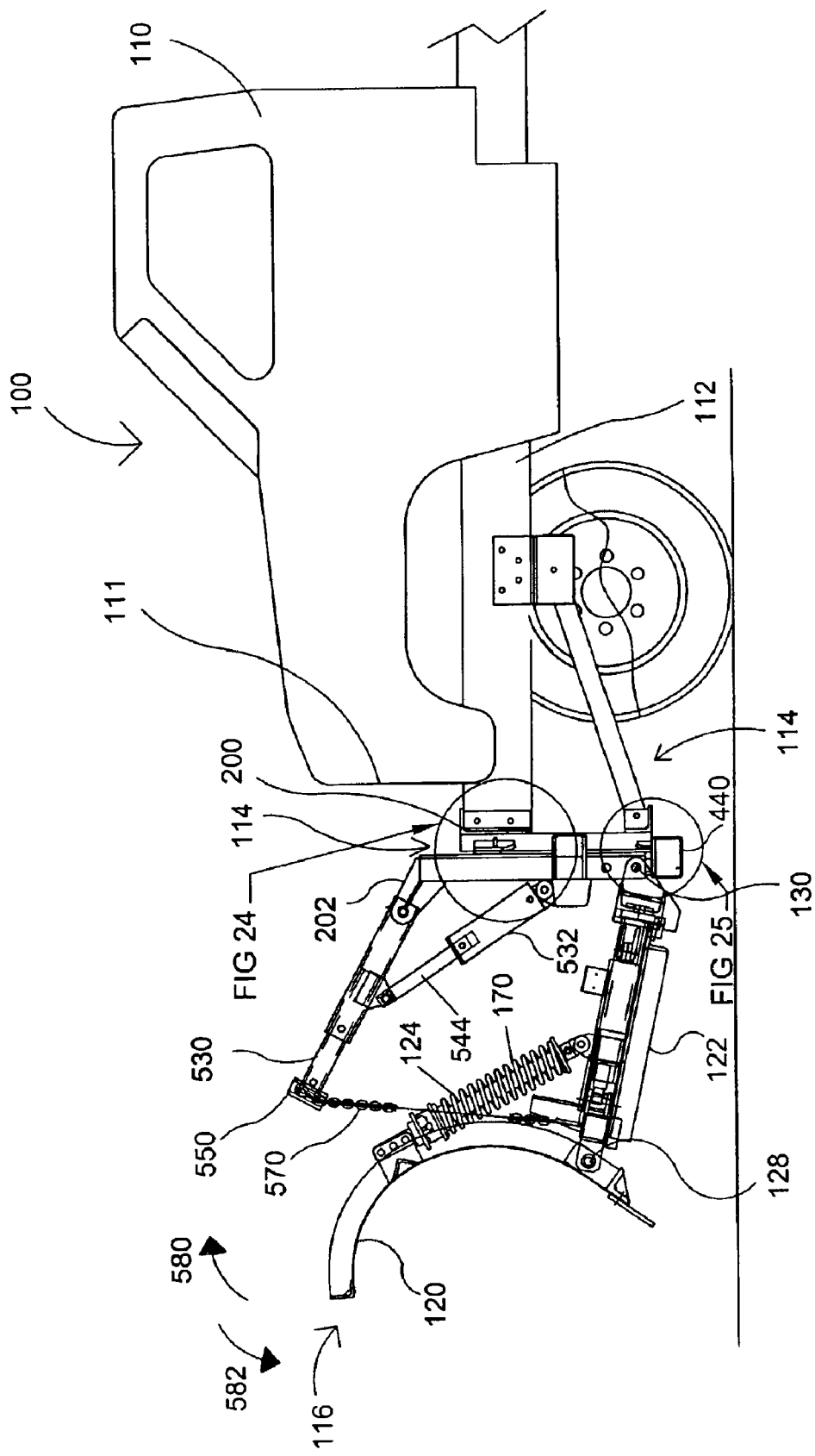
FIG. 1 is a side elevational view of a hitch assembly according to the present invention, the hitch assembly mounting a plow to a vehicle.

Now referring to the drawings, there is shown in FIG. 1 an illustrative vehicle 100 including a body 110 with a front end 111, a chassis 112, a hitch assembly 114, and a plow assembly 116. The body 110 can be secured to the chassis 112. The hitch assembly 114 can be mounted to the chassis 112 at the front end 111 of the body 110. The plow assembly 116 can be supported by the hitch assembly 114.

The snowplow 116 can include a snow plow blade or moldboard 120, a plow frame 122, and a biasing assembly 124. The moldboard 120 can be provided for removing snow and/or ice or other materials from a surface, for example. The moldboard 120 is preferably pivotally mounted at a moldboard pivot 128 to the plow frame 122, which in turn is pivotally mounted at a plow frame pivot 130 to the hitch assembly 114. The biasing assembly 124 is preferably disposed between the moldboard 120 and the plow frame 122 and provided for allowing the moldboard 120 to "trip," or pivotally move, from a plowing position to a displaced position when the plow encounters a rigid obstruction, such as a manhole cover or curb, for example.

Figure 2:
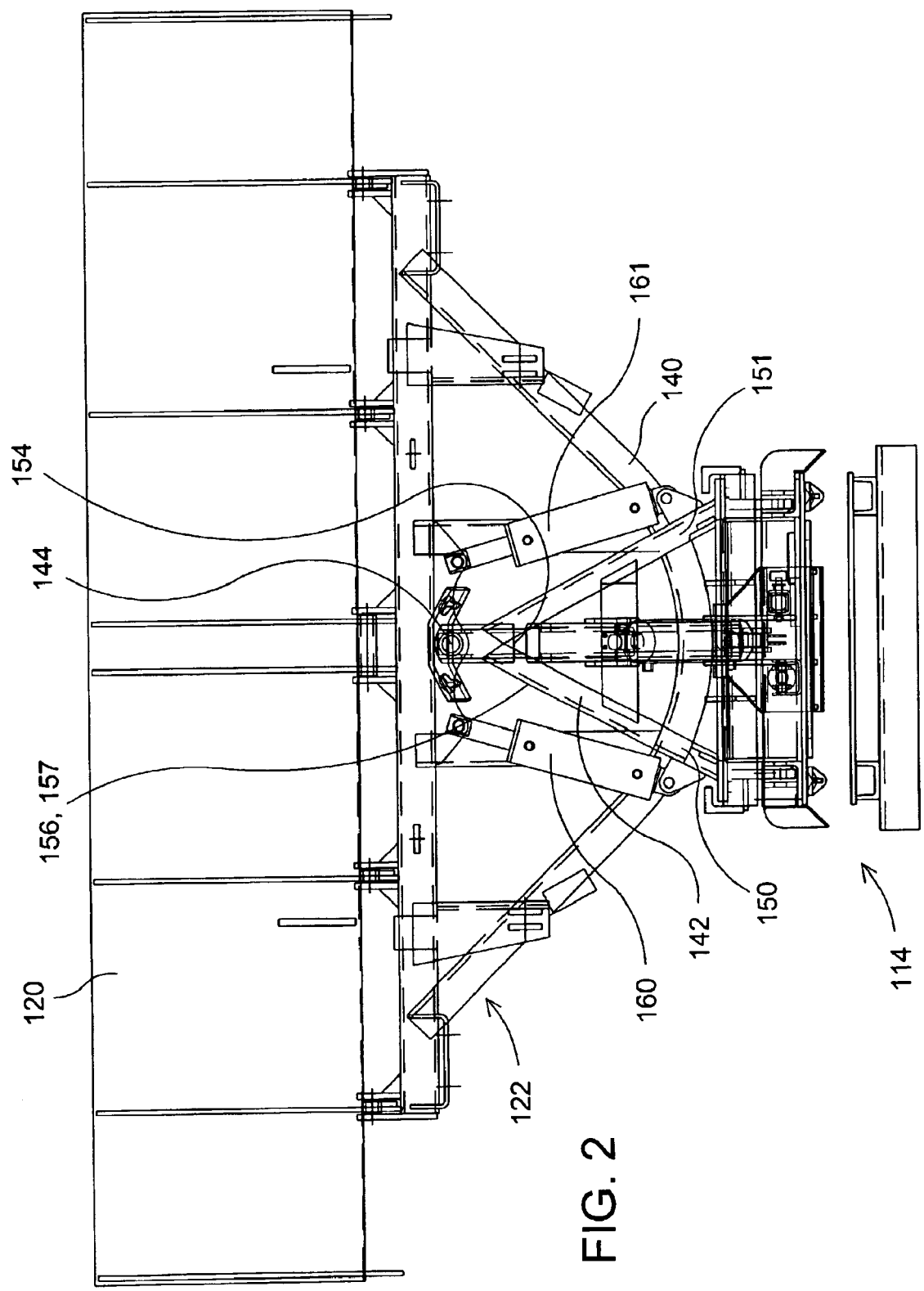
FIG. 2 is a top plan view of the plow and the hitch assembly of FIG. 1.
Figure 22:
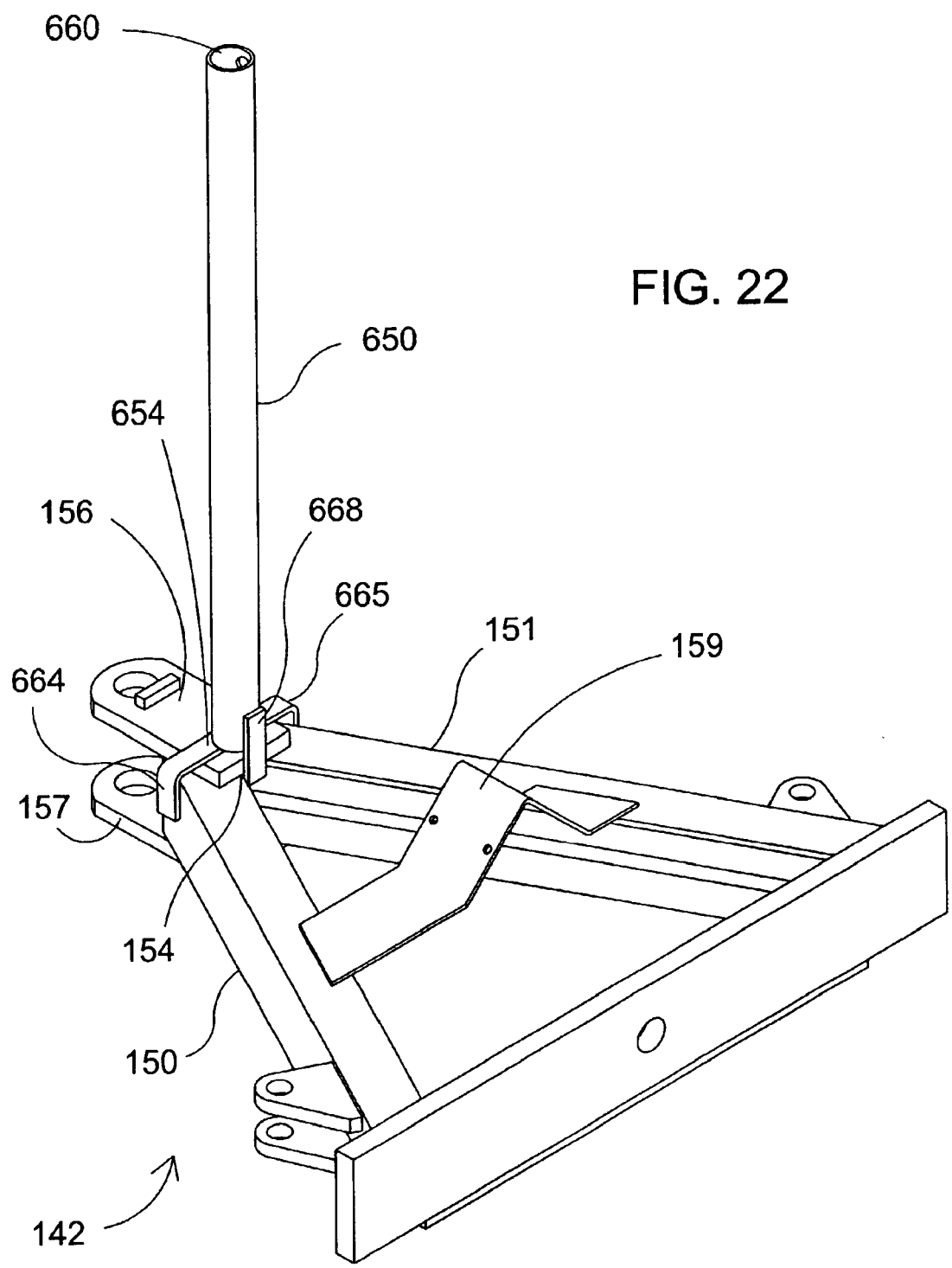
FIG. 22 is a perspective view of the brace of FIG. 19 mounted to an A-frame of the plow.

Referring to FIG. 2, the plow frame 122 preferably includes a first frame component or push frame 140 and a second frame component or A-frame 142. The push frame 140 can be pivotally mounted at a push frame pivot 144 to the A-frame 142. The push frame 140 can be mounted to the moldboard 120, and the A-frame 142 can be mounted to the hitch assembly 114. The A-frame 142 is an A-shaped member having a pair of legs 150, 151 connected at an apex 154. Referring to FIGS. 2 and 22, a pair of flanges 156, 157 extends from the apex 154 for pivotally mounting the push frame 140 to the A-frame 142 at the push frame pivot 144. The A-frame 142 can include a cross-brace 159 extending between the legs 150, 151. The cross-brace 159 can support a relief valve, often called a "cushion" valve, for providing relief means for the hydraulic system of the plow assembly to limit the amount of pressure under which the hydraulic system is placed.

Referring to FIG. 2, a pair of plow cylinders 160, 161 can be provided to pivot the push frame 140 and the moldboard 120 with respect to the A-frame 142 about the push frame pivot 144. The plow cylinders 160, 161 flank the A-frame 142, extending between the A-frame 142 and the push frame 140. The plow cylinders 160, 161 can be selectively moved to rotate the moldboard 120 about the push frame pivot 144 to allow the moldboard 120 to be disposed at a desired angle with respect to the longitudinal axis of the vehicle.

The precise configuration of the pushframe 140 can vary according to the type of vehicle onto which the assembly is to be mounted (e.g., tractor or light-duty or heavy-duty truck). In other embodiments, the plow frame 122 can comprise a single component.

Referring to FIG. 1, the biasing assembly 124 preferably includes at least one suitable compressible biasing member, such as a coil spring 170, and can be similar in construction and operation to the biasing assembly shown and described in U.S. Pat. No. 6,073,371 to Goos et al., issued Jun. 13, 2000, which is incorporated herein by reference in its entirety. The illustrative biasing assembly 124 is a "full trip" version wherein the entire moldboard pivots in response to encountering an obstruction. In other embodiments, a "cutting edge" version can be used wherein only the cutting edge of the moldboard pivots in response to striking an obstruction. In other embodiments, a brace can be provided to control the moldboard "pitch" with respect to the plow frame. In yet other embodiments, the moldboard can be rigidly mounted to the plow frame such that the moldboard does not pivot with respect thereto.

To removably mount the plow assembly 116 to the vehicle 100, the hitch assembly 114 is provided, part of which is secured to the chassis 112 and part of which is secured to the plow frame 122. The hitch assembly 114 includes a vehicle portion 200 and a plow portion 202, which is preferably removably mountable to the vehicle portion 200. To eliminate the danger posed by protrusions extending from the body 110 of the vehicle 100 when the plow is unhitched, the vehicle portion 200 includes a substantially planar mating surface which can be offset from the chassis 112 of the vehicle 100.

Referring to FIGS. 3–6, the vehicle portion 200 is shown. The vehicle portion 200 includes a first hitch frame 210 and a mounting member 212 secured thereto. Referring to FIG. 3, the mounting member 212 is preferably in the form of a rectangular plate and includes a pair of side edges 214, 215 and a pair of mounting edges 218, 219. The first hitch frame 210 preferably includes four support members arranged to define a substantially rectangular frame. The first hitch frame 210 includes a pair of side supports 220, 221 disposed in spaced relationship to each other, and a pair of transverse supports 224, 225 disposed in spaced relationship to each other. The side supports 220, 221 are disposed substantially perpendicular to the transverse supports 224, 225.

Referring to FIG. 4, the side supports 220, 221 and the upper transverse support 224 extend beyond the upper mounting edge 218. The lower mounting edge 219 can be aligned with the bottom of the lower transverse support member 225.

Referring to FIG. 5, the transverse supports 224, 225 can be in the form of L-shaped angles. The transverse supports 224, 225 have an L-shaped cross section. Referring to FIG. 6, the mounting plate 212 and the transverse supports 224, 225 define a gap 230 such that the mounting plate 212 is offset from the transverse supports 224, 225 a distance that can be defined by the size of the side supports 220, 221.

Referring to FIG. 6, the side supports 220, 221 can be in the form of U-shaped channels that extend along a respective side of the mounting plate 212 adjacent the side edges 214, 215. The side supports 220, 221 have a U-shaped cross section and are oriented so that they open toward the mounting plate 212 to define a pair of cavities 232, 233, respectively. The mounting plate 212 can be mounted to the side supports 220, 221 by a plurality of welds, for example. The side supports 220, 221 are in turn mounted to the transverse supports 224, 225, which can be respectively disposed adjacent the upper and lower mounting edges 218, 219 of the mounting plate 212, as shown in FIG. 4. The side supports 220, 221 can be mounted to the transverse supports 224, 225 by a plurality of welds, for example.

Referring to FIG. 3, the mounting plate 212 preferably includes a substantially planar face 236. Referring to FIGS. 5 and 6, the mounting plate 212 can define a distal end plane 240 beyond which no components of the vehicle portion 200 extend.

The face 236 of the mounting plate 212 can be sized such that in instances where the plow and the plow portion are not mounted to the vehicle portion 200 and the vehicle to which the vehicle portion is mounted is involved in a front-end collision, the mounting plate 212 facilitates in the distribution of impact energy, thereby reducing the risk of injury to the vehicle occupants. Furthermore, the substantially planar distal end 240 of the vehicle portion 200 does not include any projections extending therefrom, thereby reducing the risk of injury to those struck by the vehicle.

The vehicle portion 200 can be made of any suitable material, such as metal, for example.

Figure 7:
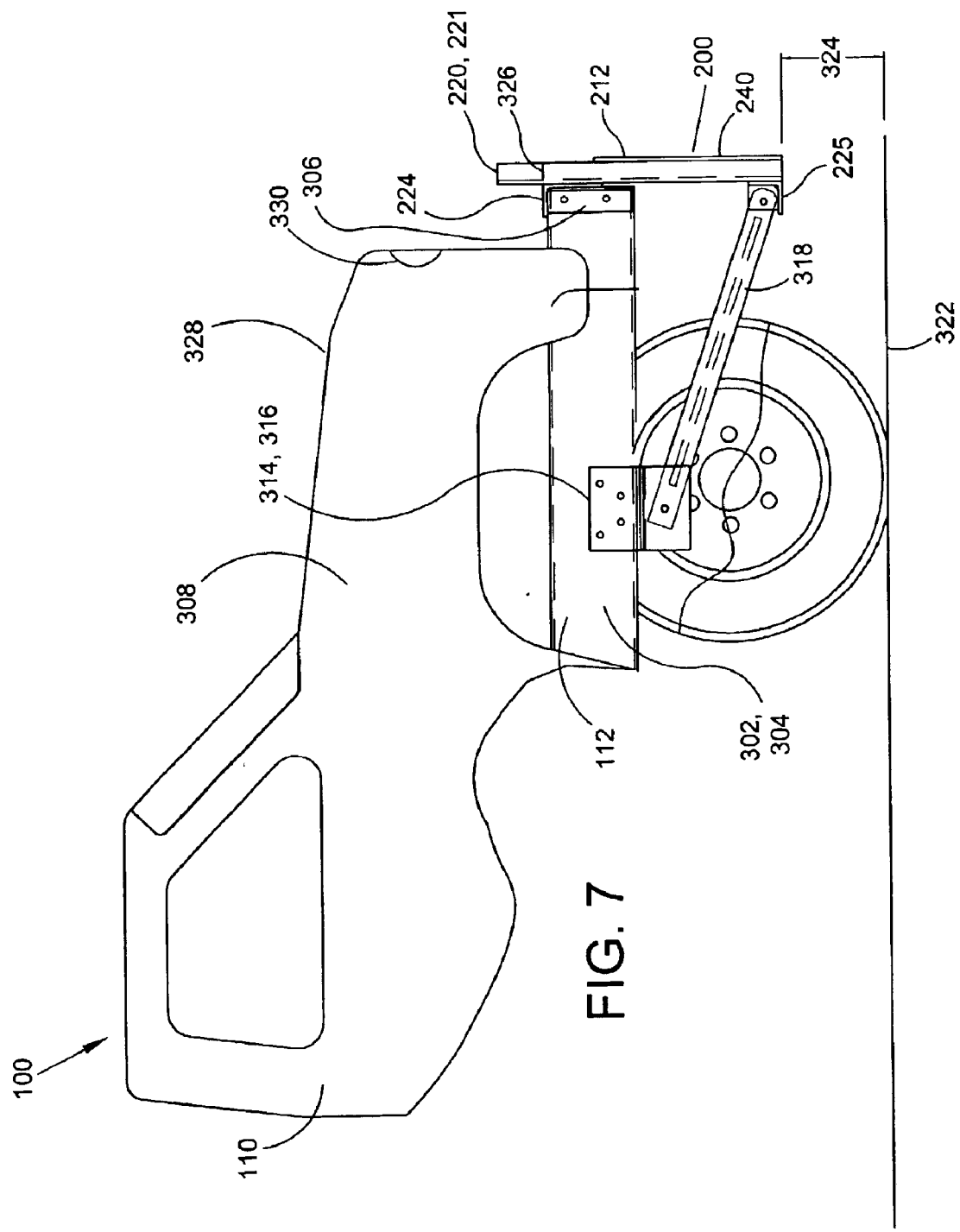
FIG. 7 is a side elevational view of the vehicle portion of FIG. 3 mounted to the vehicle.

Referring to FIG. 7, the chassis 112 of the vehicle 100 can include a pair of frame members 302, 304 that extend along either side of the body 110 and each have a distal end 306 extending beyond an engine compartment 308 of the vehicle 100. The upper transverse support member 224 of the vehicle portion 200 can be mounted separately to the chassis 112 between the frame members 302, 304 at their distal ends 306. A frame bracket 314, 316 can be fastened to each frame member 302, 304. A pair of support bars 318 can be respectively secured to the frame brackets 314, 316, extending between the frame brackets 314, 316 and the lower transverse support 225 of the vehicle portion 200.

Referring to FIG. 7, the mounting plate 212 is disposed at a distal end 240 of the vehicle portion 200. The vehicle portion 200 can be mounted to the chassis 112 with the upper transverse support member 224 of the vehicle portion 200 engaging the frame members 302, 304 and the lower transverse support member 225 engaging the support bars 318. To prevent the vehicle portion 200 from inadvertently hitting a road surface 322 during operation, the vehicle portion 200 can be mounted to the chassis 112 of the vehicle 100 such that there is a predetermined clearance 324 between the lower transverse support 225 and the surface 324. Preferably, the upper part of the side supports 220, 221 of the vehicle portion 200 can be trimmed even with the top of the chassis 112, as shown by a phantom line 326 in FIG. 7. The vehicle portion 200 can be located below a hood 328 of the engine compartment 308 and a pair of headlights 330 of the vehicle 100. The vehicle portion 200 can be mounted to the chassis 112 to permit ready access to the engine compartment 308 underneath the hood 328.

Figure 8:
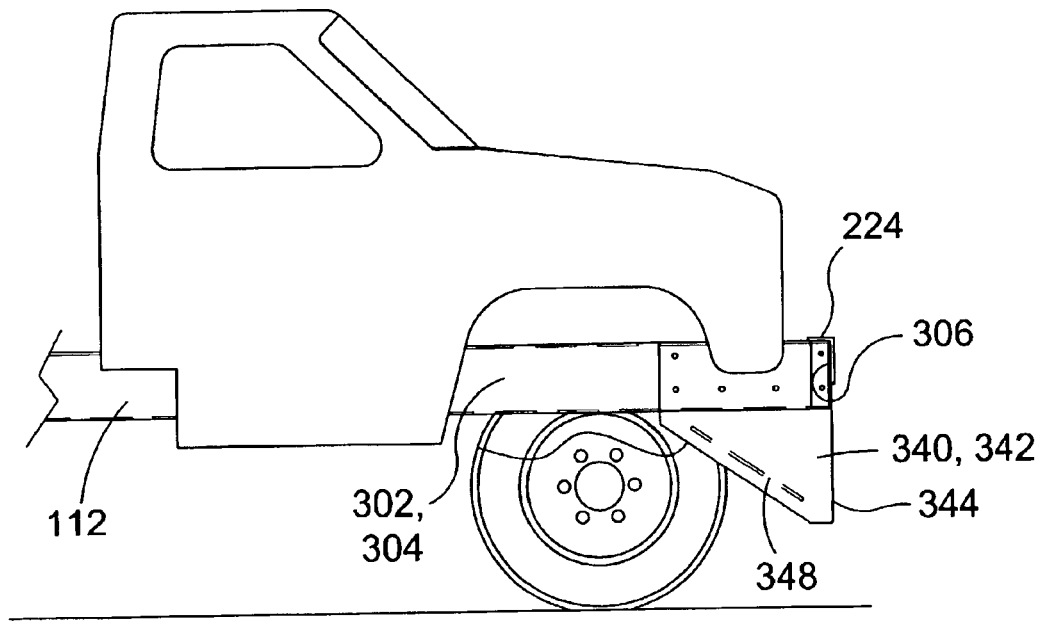
FIG. 8 is a side elevational view of another embodiment of a vehicle portion mounting arrangement for the vehicle useful in connection with the hitch assembly according to the present invention.

Referring to FIG. 8, an alternative support arrangement for the vehicle portion is shown. A side plate 340, 342 can be secured to each frame member 302, 304 such that an end 344 of each side plate 340, 342 is respectively aligned with the distal end 306 of the frame member 302, 304 to which it is mounted. Stiffeners 348 can be attached to the side plates 340, 342 for added rigidity.

Figure 9:
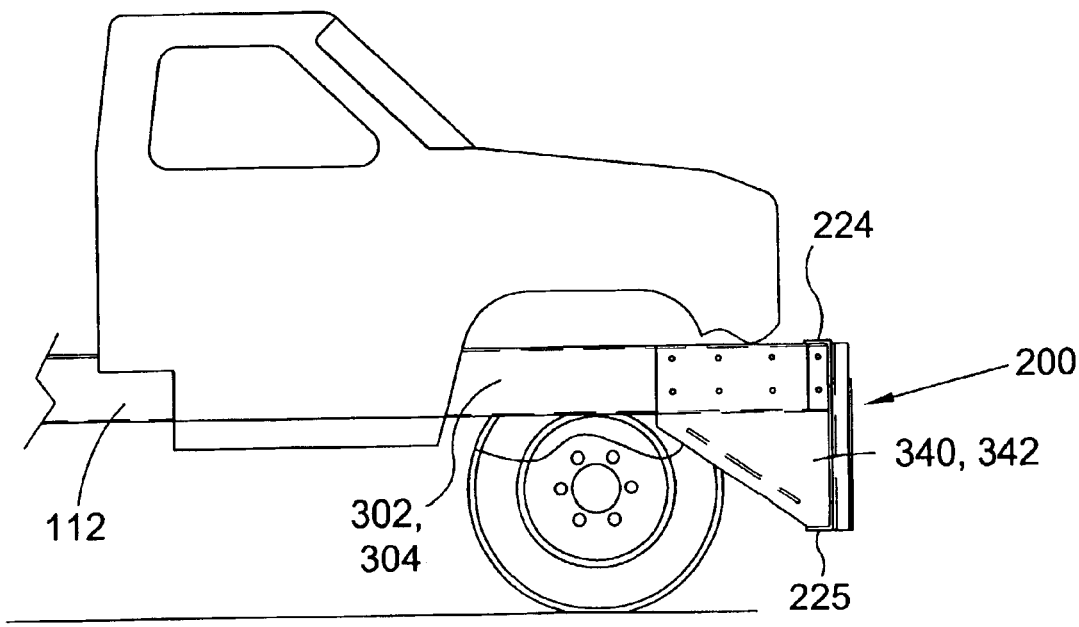
FIG. 9 is a side elevational view similar to FIG. 8, illustrating the vehicle portion of FIG. 3 mounted to the vehicle.

Referring to FIG. 9, the vehicle portion 200 can be mounted to the chassis 112 such that the upper transverse member 224 engages the frame members 302, 304 and the lower transverse support member 225 engages the side plates 340, 342. The vehicle portion 200 can be secured to the chassis 112 by a plurality of welds, for example.

Referring to FIGS. 10–17, the plow portion 202 of the hitch assembly is shown. The plow portion 202 includes a second hitch frame 410, a movable member 412 movably mounted to the second hitch frame 410, and a lift assembly 414 for selectively moving the plow about the plow frame pivot 130. The plow portion includes a vehicle side 416 and a plow side 418.

Figure 10:
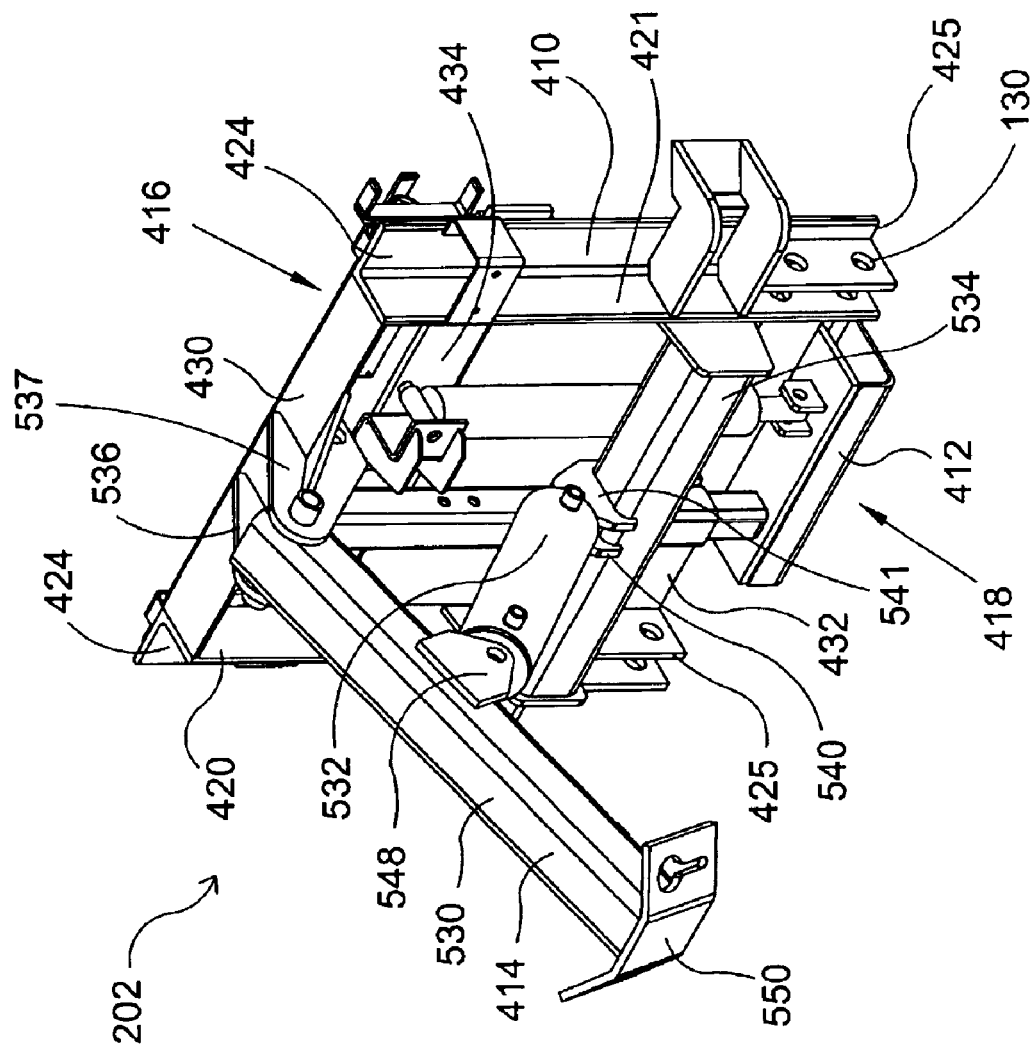
FIG. 10 is a front perspective view of a plow portion of the hitch assembly of FIG. 1.
Figure 11:
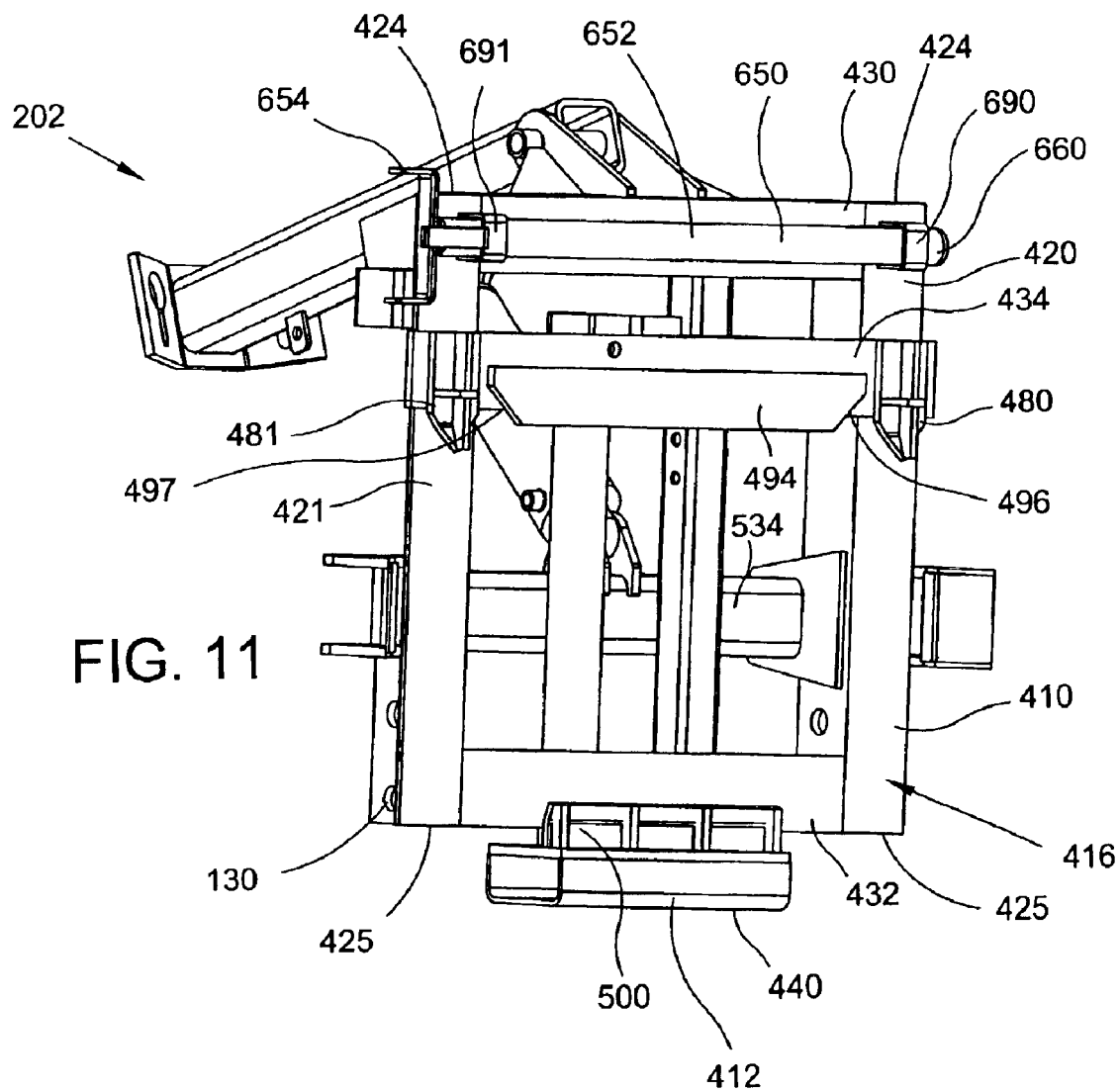
FIG. 11 is a rear perspective view of the plow portion of FIG. 10.

Referring to FIGS. 10 and 11, the second hitch frame 410 includes a pair of side support members 420, 421 disposed in spaced relationship to each other. Each side support member 420, 421 includes an upper end 424 and a lower end 425. Three transverse support members extend between the side supports. An upper transverse support member 430 extends between the side members 420, 421 adjacent the upper ends 424 thereof. A lower transverse support member 432 extends between the side members 420, 421 adjacent the lower ends 425 thereof. An intermediate transverse support member 434 extends between the side members 420, 421 at a predetermined point between the upper and lower ends 424, 425 of the side support members 420, 421. The side support members 420, 421 can be in the form of L-shaped angles which have a generally L-shaped cross-section. The lower and intermediate transverse support members 432, 434 can be in the form of generally flat plates. The upper transverse 430 support member can be L-shaped having an L-shaped cross section. The support members 420, 421, 430, 432, 434 of the second hitch frame 410 can be secured to each other by a plurality of welds, for example.

Figure 12:
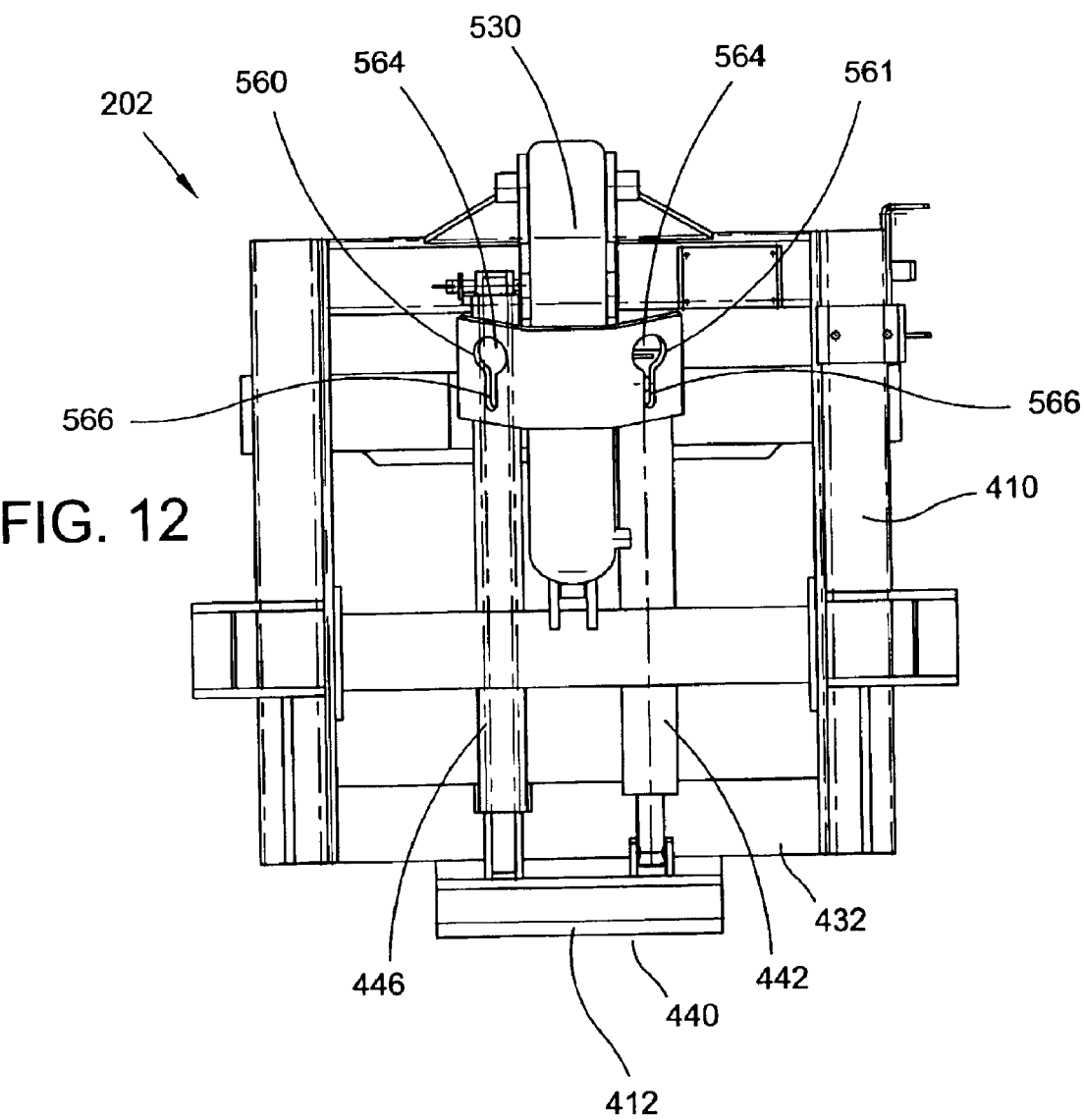
FIG. 12 is a front elevational view of the plow portion of FIG. 10.
Figure 13:
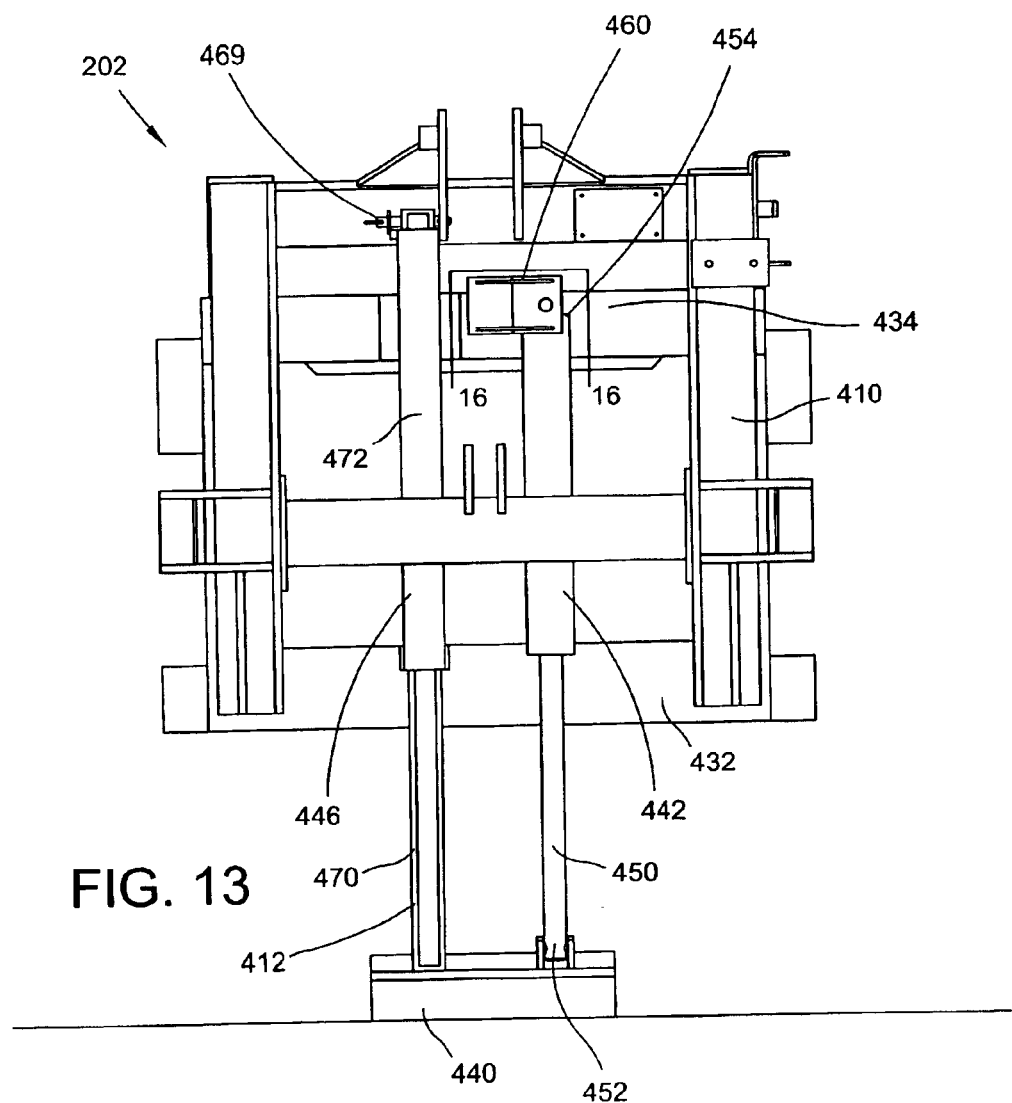
FIG. 13 is a front elevational view of the plow portion of FIG. 10 with a lift assembly removed for illustration purposes.

Referring to FIGS. 12–14, the movable member 412 can be in the form of a jack stand. The movable member 412 can include a base 440, a hydraulic cylinder 442, and a leg 446. Referring to FIG. 13, the jack cylinder 442 can be provided to allow the base 440 to be movable. The jack cylinder 442 includes a reciprocating piston 450 having a distal end 452 pivotally mounted to the base 440. The other end 454 of the jack cylinder 442 is pivotally connected to the intermediate transverse support member 434 of the second hitch frame 410. The piston 450 of the jack cylinder 442 can be pivotally mounted to the base 440 by being journaled thereto.

Referring to FIGS. 13 and 16, for attaching the jack cylinder 442 to the second hitch frame 410, a cylinder mounting bracket 460 can be welded or otherwise secured to the front side of the intermediate transverse support member 434. The mounting bracket 460, as illustrated in FIG. 16, can be generally Z-shaped. A gusset 462 can extend from the mounting bracket 460. The mounting bracket 460 defines a cavity 464 between itself and the intermediate transverse support 434. The jack cylinder 442 is positioned within the cavity 464 and secured to the mounting bracket 460 with a pin 466. The pinned arrangement between the jack cylinder 442 and the second hitch frame 410 allows for pivotal movement of the jack cylinder 442 with respect to the second hitch frame 410. Advantageously, because the Z-shaped mounting bracket 460 does not fully surround or enclose the jack cylinder 442, hydraulic lines can access the jack cylinder.

The jack stand 412 is selectively movable over a range of travel between a retracted position, as shown in FIG. 12, and an extended position, as shown in FIG. 13. Referring to FIG. 12, when the movable member 412 is in the retracted position, the base 440 is adjacent the lower transverse support member 432 of the second hitch frame 410. Referring to FIG. 13, when the movable member 412 is in the extended position, the hydraulic cylinder 442 is fully extended and the base 440 is at a predetermined, maximum distance from the lower transverse support member 432 of the second hitch frame 410. As such, the jack stand 412 has a predetermined range of motion with respect to the second hitch frame 410.

Referring to FIG. 13, for increasing the stability of the jack stand 412, the leg 446 is provided. The leg 446 is disposed in substantially parallel, spaced relationship to the jack cylinder 442. The leg 446 is mounted to the second hitch frame 410 by a plurality of welds, for example, such that the leg is secured to the lower and intermediate transverse support members 432, 434. The leg can be mounted to the base 440. The leg 446 includes a guide rod 470 and a guide tube 472 with the guide tube 472 being mounted to the second hitch frame 410 at the lower and intermediate transverse support members 432, 434 and the guide rod 470 being mounted to the base 440. The guide rod 470 is movably disposed in the guide tube 472. A safety pin arrangement 469 can be provided to secure the guide rod 470 with respect to the guide tube 472, for example, in either a fully retracted position or in a fully extended position. The leg 446 can be configured to increase the stability of the plow portion 202 when the base 440 of the movable member 412 supports the plow portion. The jack cylinder 442 and the leg 446 cooperate to stabilize the plow portion 202 over the range of travel of the movable member 412.

Referring to FIGS. 11 and 14, for hitching the plow portion 202 to the vehicle portion, the second hitch frame 410 and the jack stand 412 can be configured to cooperate with each other to act as a vise or clamp. The second hitch frame 410 includes a pair of stationary clamping members 480, 481 extending from the intermediate transverse support member 434 on the vehicle side 416 of the plow portion 202. The clamping projections 480, 481 can be in the form of hook-shaped fingers. The stationary clamping fingers 480, 481 are in spaced relationship to each other.

Referring to FIG. 14, each stationary clamping finger 480, 481 includes a distal end 484 having a beveled surface 486. Each clamping finger 480, 481 can include a stiffening rib 488. Each stationary clamping finger 480, 481 defines a clamping recess 490 for receiving the mounting plate of the vehicle portion.

Referring to FIG. 11, a stationary clamping plate 494 depends from the intermediate transverse support member 434 of the second hitch frame 410. The stationary clamping plate 494 is disposed between the clamping fingers 480, 481. Preferably, the lower corners 496, 497 of the clamping plate 494 are chamfered.

Referring to FIGS. 11 and 14, the movable member 412 includes a clamping member 500 disposed on the base 440. The movable clamping member 500 can be in the form of a plate. Referring to FIG. 14, the movable clamping member 500 includes a distal end 502 having a beveled surface 504. The movable clamping member 500 is substantially aligned with the stationary clamping projections 480, 481, 494. The stationary and movable clamping members 480, 481, 494, 500 are disposed on the vehicle side 416 of the plow portion 202.

Referring to FIG. 15, to facilitate alignment of the mounting plate of the vehicle portion with respect to the plow portion 202, a pair of guide gussets 510, 511 can be provided, flanking the second hitch frame 410. The guide gussets 510, 511 extend from the side support members 420, 421 so that they project from the vehicle side 416 of the plow portion 202. Each guide gusset 510, 511 includes a distal end 514 having a beveled surface 516 which can be tapered inwardly for facilitating the alignment of the plow portion 202 with respect to the vehicle portion when mounting the portions to each other. Each guide gusset 510, 511 includes an inner edge 518, 519, respectively. The inner edges 518, 519 can be configured such that they are spaced apart from each other a distance sufficient to permit the mounting plate of the vehicle portion to be disposed therebetween.

Referring to FIGS. 10 and 14, to selectively move the plow assembly with respect to the plow portion 202 of the hitch assembly, the lift assembly 414 can be provided. The lift arm assembly includes a lift arm 530, a lift cylinder 532, a lift support brace 534, and a pair of lift gussets 536, 537. The lift support brace 534 extends transversely between the side support members 420, 421 of the second hitch frame 410. The lift support brace 534 includes a pair of gussets 540, 541 which can receive one end of the lift cylinder 532, which in turn can be pinned to the gussets 540, 541 for journaled movement.

The lift cylinder 532 includes a movable piston 544 having a distal end 546 which can be pivotally mounted to an intermediate point of the lift arm 530 with a journaled arrangement 548. The other end of the lift cylinder 532 is journaled between the gussets 540, 541.

The lift arm 530 is pivotally mounted to the upper transverse support member 430 by the lift gussets 536, 537 which are in turn mounted to the upper transverse support member 430. The lift arm 530 includes a distal end in the form of a beveled plow plate 550.

Referring to FIG. 12, to interconnect the lift arm 530 and the plow frame, a pair of chain-retaining apertures 560, 561 for receiving chains therethrough and securing the same are disposed through the plow plate 550 disposed at the distal end of the lift arm 530. Each chain-retaining aperture 560, 561 can have a generally keyhole-shaped configuration including a generally circular portion 564 and a slot 566 with the generally circular portion 564 being configured to accept a chain therethrough and the slot 566 being configured to accept a link of the chain to retain the chain.

Referring to FIG. 1, a pair of supports in the form of chains 570 extends between the plow plate 550 and the plow frame 122. When the piston 544 of the lift cylinder 532 is extended, the lift arm pivots 530 in a lifting direction 580, thereby lifting the moldboard 120 and the plow frame 122, which can pivotally move about the plow frame pivot 130. The piston 544 of the lift cylinder 532 can be retracted to move the lift arm 530 in a lowering direction 582, thereby allowing the moldboard 120 and the plow frame 122 to also move in the lowering direction 582.

Figure 18:
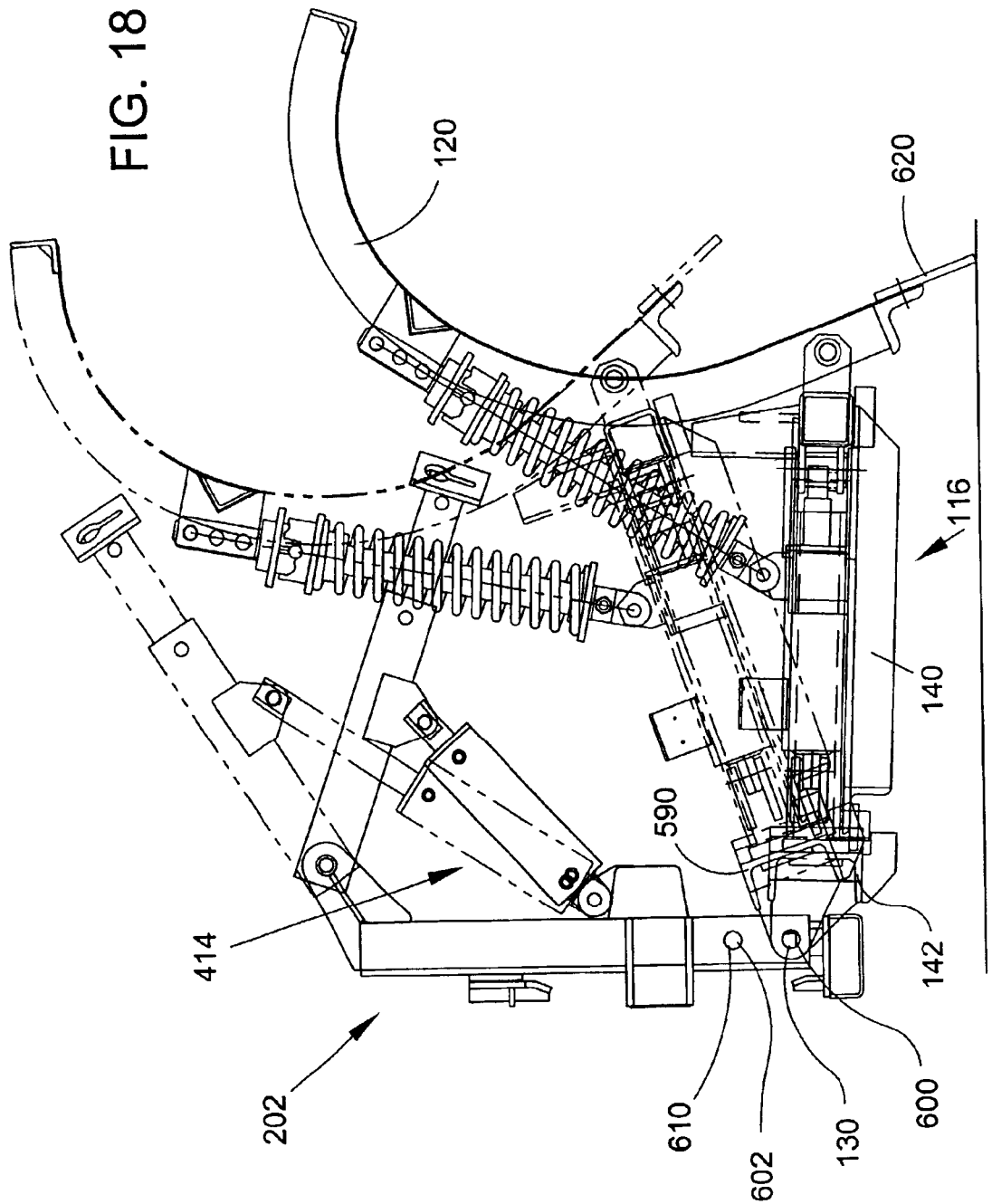
FIG. 18 is a side elevational view of the plow and the plow portion of the hitch assembly of FIG. 1, illustrating the plow in a plowing position in full lines and in an elevated position in phantom lines.

Referring to FIGS. 17 and 18, a portion 590 of the A-frame 142 of the plow assembly 116 is shown mounted to the plow portion 202 of the hitch assembly. The A-frame 142 can be pivotally mounted to the plow portion 202 and is pivotally mounted to the push frame 140. Each side support 420, 421 of the second hitch frame 410 can include a plow mounting plate 592 and a plurality of plow mounting holes 600, 602. The A-frame 142 can be journaled to the side supports 420, 421 and the plow mounting plates 592 at the plow mounting holes 600 which are vertically aligned with each other to define the plow frame pivot 130. The A-frame 142 can be pivotally mounted to the other set of plow mounting holes 602 to define a second plow frame pivot 610.

Referring to FIG. 18, the plow assembly 116 is shown in a plowing position in full lines and in an elevated position in phantom lines. The plow assembly 116 is movable between the plowing position and an elevated position by selective movement of the lift assembly 414. When in the plowing position, a cutting edge 620 of the moldboard 120 can be engaged with the surface to be plowed.

Figure 19:
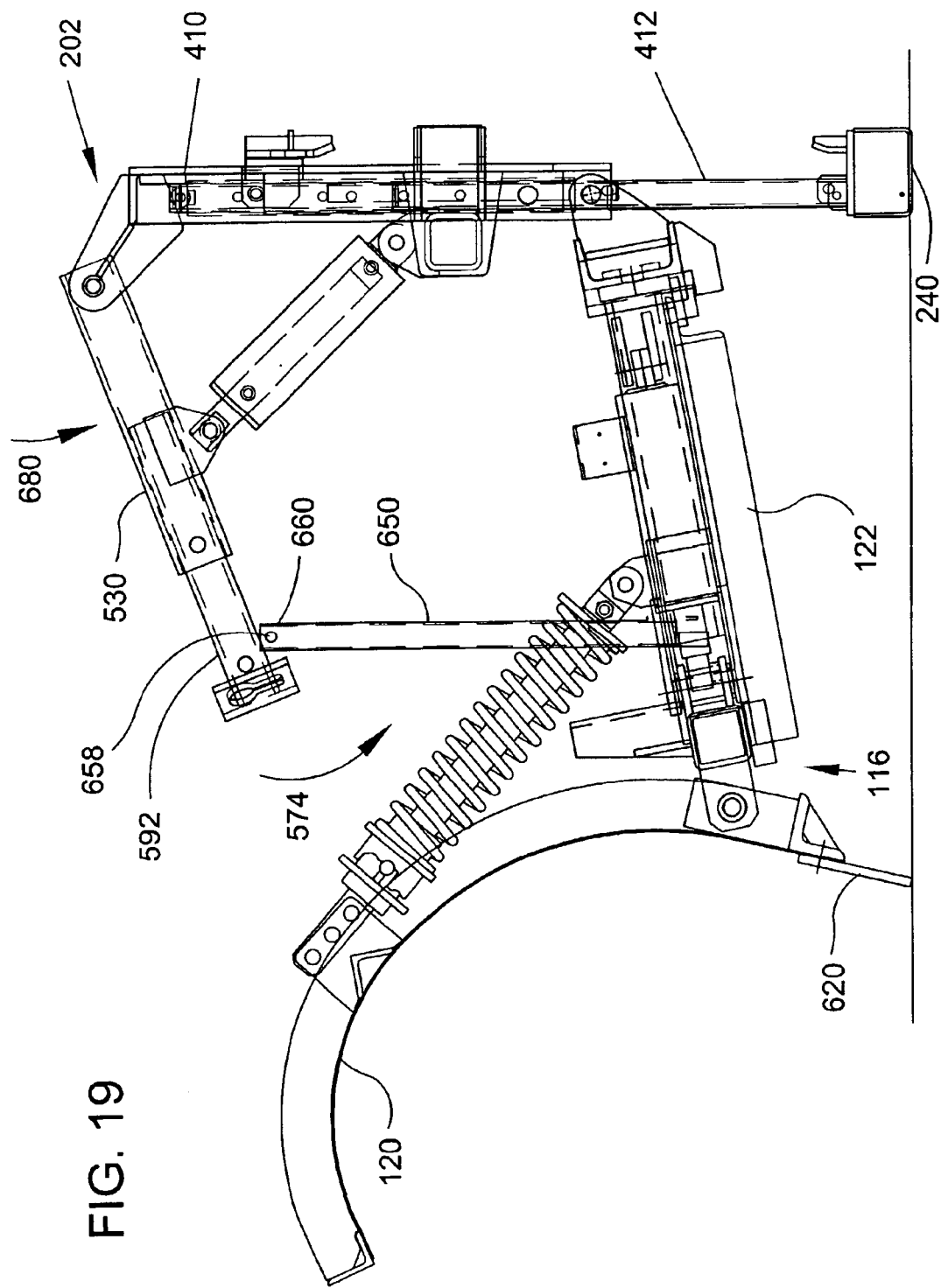
FIG. 19 is a side elevational view of the plow and the plow portion of FIG. 18 in a storage position, illustrating a brace mounted thereto.

Referring to FIG. 19, the plow assembly 116 and the plow portion 202 of the hitch assembly are in a storage position. The jack stand 412 is in the extended position. The base 240 of the jack stand 412 and the cutting edge 620 of the moldboard 120 contact a surface, thereby disposing the plow frame 122 apart from the surface to prevent the plow frame 122 from becoming damaged through contact with the surface.

To maintain the plow portion 202 in a substantially upright position when not in use, a brace 650 can be provided. The brace 650 can be placed between the lift arm 530 and the plow frame 122. Preferably, the brace 650 is put in place before the plow portion 202 is unhitched from the vehicle portion of the hitch assembly.

Referring to FIGS. 20 and 21, the brace 650 can be in the form of an elongated shaft 652 having a retention member 654 at a first end 656 and a hole 658 disposed therethrough at a second end 660. The retention member 654 can be configured to retentively engage the plow frame. The retention member 654 can include a pair of opposing outer prongs 664, 665 and a middle prong 668 disposed between the outer prongs 664, 665.

Referring to FIG. 22, the brace 650 can be engaged with the A-frame 142 such that the two outer prongs 664, 665 of the retention member 654 engage the outer edges of the legs 150, 151 of the A-frame 142 and the middle prong 668 is wedged between the legs 150, 151 adjacent the apex 154 of the A-frame 142. The second end 660 of the brace 650 extends from the A-frame 142 to support the distal end 592 of the lift arm 530, as shown in FIG. 19. The hole 658 disposed at the second end 660 of the brace 650 can be used to retentively pin the brace 650 to the lift arm 530.

In other embodiments, the brace can be mounted to the lift arm using other techniques. Disposing the brace 650 between the plow frame 122 and the lift arm 530 can create a four-bar linkage that prevents the lift arm 530 from rotating in a collapsing direction 680 and that maintains the second hitch frame 410 and the movable member 412 in a substantially vertical position, as shown in FIG. 19.

Referring to FIG. 11, for storing the brace 650 when the plow portion 202 is mounted to the vehicle portion, for example, a pair of keeper brackets 690, 691 can be provided on the vehicle side 416 of the plow portion 202. The keeper brackets 690, 691 can be aligned with respect to each other and the upper transverse support member 430. The 652 shaft of the brace 650 can be inserted through the keeper brackets 690, 691 for retaining the brace. To secure the brace 650 within the keeper brackets 690, 691, a pin can be inserted through the hole adjacent the second end 660 of the brace 650 such that the pin and the retention member 654 of the brace can engage the keeper brackets 690, 691 to substantially prevent the brace 650 from moving transversely with respect to the keeper brackets 690, 691. The keeper brackets 690, 691 can be disposed such that the stored brace does not interfere with the hitching of the plow portion 202 to the vehicle portion.

The plow portion 202 of the hitch assembly can be made from any suitable material, such as, metal, for example.

Figure 23:
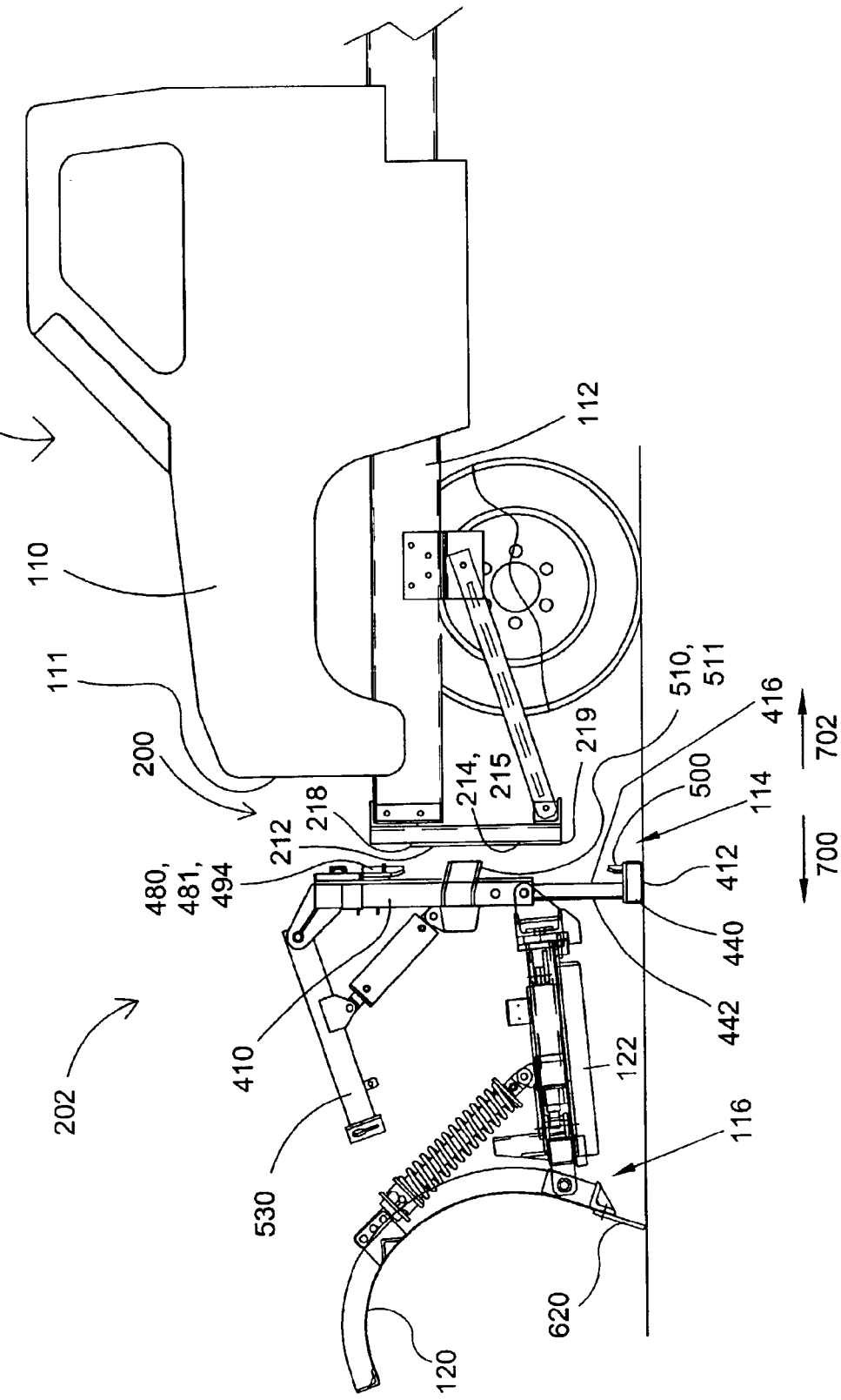
FIG. 23 is a side elevational view of the plow, the hitch assembly, and the vehicle of FIG. 1, illustrating the plow mounted to the plow portion of the hitch assembly and the vehicle portion of the hitch assembly mounted to the vehicle.

Referring to FIG. 23, to mount the plow assembly 116 to the body 110 of the vehicle 100, the hitch assembly 114 can be provided. The vehicle portion 200 can be mounted to the chassis 112 so that the mounting plate 212 is parallel to and offset from the front end 111 of the body 110. The plow portion 202 of the hitch assembly 114 can be mounted to the plow assembly 116. The vehicle side 416 of the plow portion 202 can be disposed adjacent the vehicle portion 200 of the hitch assembly 114 such that the clamping projections 480, 481, 494, 500 extend toward the vehicle portion 200. The stationary clamping members 480, 481, 494 of the second hitch frame 410 can be positioned above the upper mounting edge 218 of the mounting plate 212. The movable clamping member 500 of the base 440 can be disposed below the lower mounting edge 219 of the mounting plate 212.

The vehicle portion 200 can be moved with respect to the plow portion 202 of the hitch assembly 114 in a mounting direction 700 until the mounting plate 212 is substantially aligned with the movable clamping member 500 and the stationary clamping members 480, 481, 494. The guide gussets 510, 511 of the plow portion can facilitate the alignment of the vehicle portion 200 with respect thereto. As the vehicle portion 200 engages the plow portion 202, the guide gussets 510, 511 can engage the side edges 214, 215 of the mounting plate 212 to facilitate the alignment of the portions 200, 202.

A single operator can position the plow portion 202 of the hitch assembly with respect to the vehicle portion 200. Furthermore, the operator need not be in the vicinity of the hitch thereby reducing the risk of injury to the operator.

Figure 24:
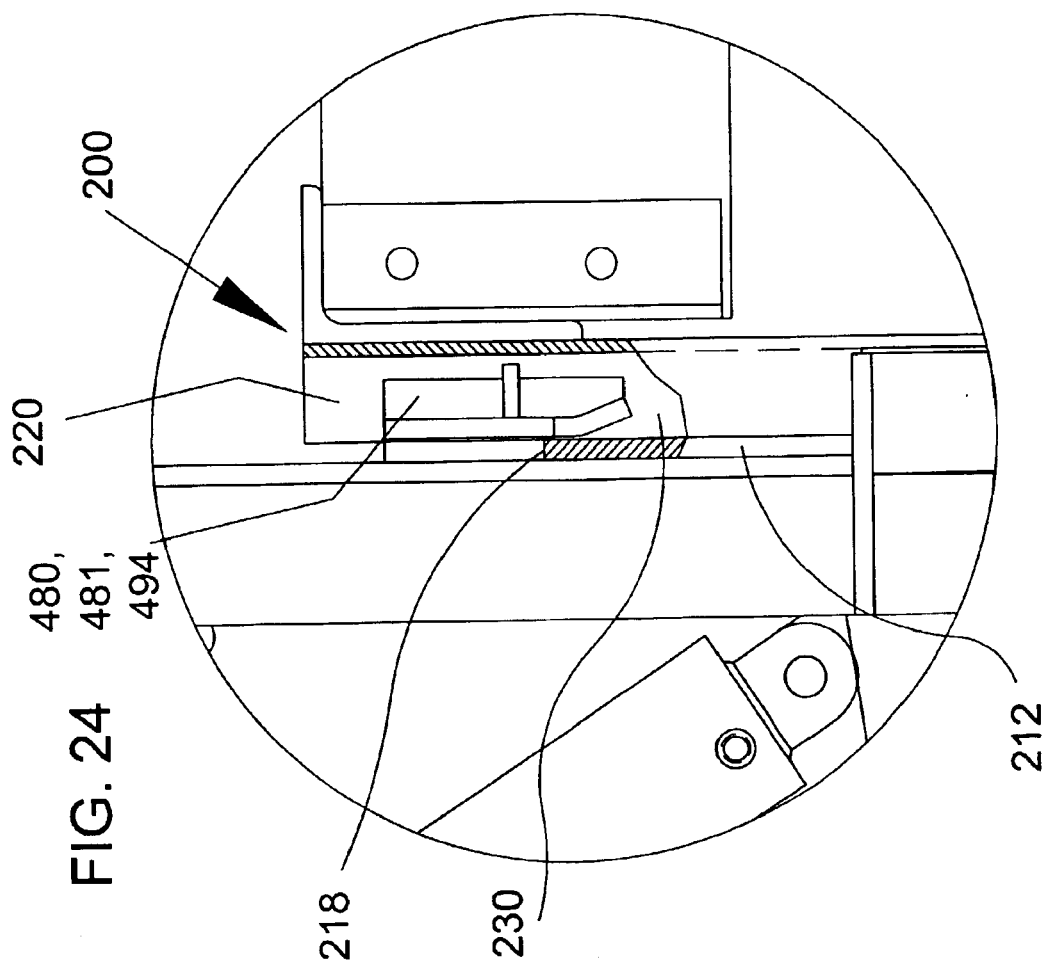
FIG. 24 is an enlarged, detail view taken from FIG. 1.

Once the vehicle portion 200 is disposed such that the mounting plate 212 of the vehicle portion is substantially aligned with and disposed between the clamping projections, the jack stand 412 and the second hitch frame 410 can cooperate to clamp the mounting plate 212 therebetween. The jack cylinder 442 can be moved toward the retracted position, thereby lowering the second hitch frame 410 so that the clamping members 480, 481, 494 of the second hitch frame engage the upper mounting edge 218 of the mounting plate 212, as shown in FIG. 24. The clamping members of the second hitch frame can extend into the gap 230 and engage at least a portion of the upper mounting edge located between the side supports 220 of the vehicle portion 200. Continued retraction of the jack cylinder moves the jack stand away from the surface. The jack stand can be retracted so that the clamping member of the base engages the lower mounting edge of the mounting plate. The brace can be removed from between the plow frame 122 and the lift arm 530 and stored on the second hitch frame 410.

Figure 25:
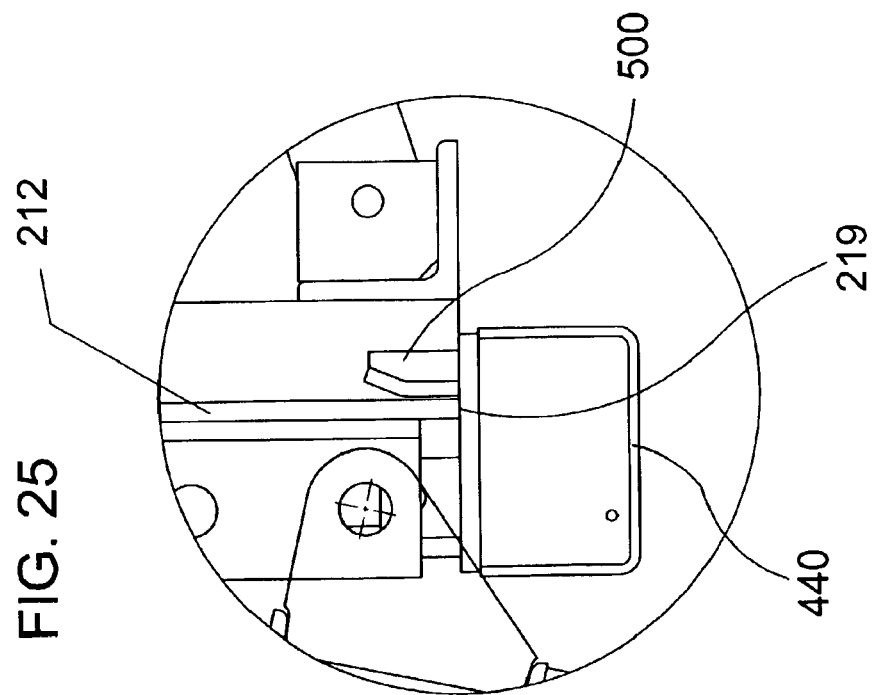
FIG. 25 is an enlarged, detail view taken from FIG. 1.

Referring to FIG. 25, the movable clamping member 500 on the base 440 can extend behind the mounting plate 212 and engage the lower edge 219 of the mounting plate 212. The mounting plate 212 can be clamped between the stationary clamping members of the second hitch frame and the movable clamping member of the jack stand, as shown in FIG. 1. Referring to FIG. 1, for substantially preventing the plow portion 202 from sliding laterally with respect to the vehicle portion 200, the stationary clamping members and the movable clamping member can exert a clamping force therebetween such that the plow portion 202 and the plow 116 are restrained from moving longitudinally and transversely with respect to the vehicle portion 200.

The entire mounting process can be carried out readily by a singe operator. Because the operator need not be in the vicinity of the hitch to conduct the hitching process, the risk of injury to the operator is thereby reduced.

Referring to FIG. 23, to unhitch the plow portion 202 and the plow assembly 116 from the vehicle portion 200, the cutting edge 620 of the moldboard 120 can be lowered to engage the surface. The brace can be disposed between the plow frame 122 and the lift arm 530. The operator can lower the base 440 of the jack stand 412 via the jack cylinder 442 to thereby disengage the movable clamping member 500 from the lower mounting edge 219 of the mounting plate 212. Once the base 440 contacts the surface, further extension of the jack cylinder 442 raises the second hitch frame 410 with respect to the upper edge 218 of the mounting plate 212, thereby disengaging the stationary clamping members from the mounting plate. Once the clamping members have released and cleared the mounting plate, the operator can move the vehicle portion 200 away from the plow portion in an unhitching direction 702. The plow portion 202 can be stored in its storage position. Thus, a single operator can readily unhitch and store the plow in a short time with reduced risk of injury to himself.

Thus, the invention provides a hitch assembly that can provide increased safety and ease of use. The ease and speed of the mounting and un-mounting operations facilitate the routine maintenance of the vehicle. Specifically, the flat plate of the vehicle portion presents a substantially flush distal end.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A hitch assembly for mounting a plow to a vehicle comprising:
    a vehicle portion for mounting to a vehicle, the vehicle portion including a mounting member having a substantially planar face; and
    a plow portion for supporting a plow, the plow portion including a frame and a movable member, the movable member movable with respect to the frame, the movable member including a clamping member, the clamping member being adjustable to engage the mounting member for removably mounting the plow portion to the vehicle portion, wherein the movable member of the plow portion includes a cylinder and a base, the cylinder mounted to the frame and the base, the cylinder including a movable piston, the cylinder operable to selectively move the base, and the clamping member extending from the base, the movable member of the plow portion includes a leg, the leg mounted to the frame and the base, the leg including a tube and a rod, the rod movable with respect to the tube, the leg in spaced relationship to the cylinder.

2. The hitch assembly according to claim 1 wherein the vehicle portion includes a second frame, the second frame supporting the mounting member.

3. The hitch assembly according to claim 2 wherein the second frame includes a pair of side support members in spaced relationship to each and a pair of transverse support members extending between the side support members.

4. The hitch assembly according to claim 1 wherein the plow portion includes a lift assembly for selectively moving the plow.

5. The hitch assembly according to claim 4 wherein the lift assembly includes a lift arm and a lift cylinder, the lift arm being pivotally mounted to the frame, and the lift cylinder extending between the lift arm and the frame, the lift cylinder including a movable piston, the lift cylinder operable to selectively move the lift arm.

6. The hitch assembly according to claim 5 wherein the lift arm includes a distal end configured to support the plow.

7. The hitch assembly according to claim 5 further comprising:
    a removable brace for engaging the lift arm to prevent rotation thereof in at least one direction.

8. The hitch assembly according to claim 1 wherein the frame of the plow portion includes a pair of side support members in spaced relationship to each other and a plurality of transverse support members.

9. The hitch assembly according to claim 1 wherein the cylinder is pivotally mounted to the frame and the base.

10. The hitch assembly according to claim 1 wherein the leg is pivotally mounted to the frame and the base.

11. The hitch assembly according to claim 1 wherein the frame of the plow portion includes a second clamping member, the clamping member of the movable member being adjustable with respect to the second clamping member of the frame to engage the mounting member between the clamping members.

12. The hitch assembly according to claim 11 wherein each clamping member includes a hook-shaped projection.

13. The hitch assembly according to claim 1 wherein the frame of the plow portion includes a plurality of beveled guide gussets.

14. A vehicle comprising:
a chassis;
a body secured to the chassis, the body having a front end;
a plow assembly mounted to the chassis;
a hitch assembly disposed between the plow assembly and the chassis for mounting the plow assembly to the chassis, the hitch assembly including a mounting member mounted to the chassis adjacent the front end of the body, the mounting member including a substantially planar face, and a frame for supporting the plow assembly, the frame removably mounted to the mounting member, the hitch assembly including a movable damning member movably mounted to the frame, the frame being removably mounted to the mounting member via the movable clamping member, the hitch assembly including a movable member having a cylinder and a base, the cylinder extending between the frame and the base, the cylinder including a movable piston, the cylinder operable to selectively move the base, and the movable clamping member extending from the base, the movable member including a leg, the leg mounted to the frame and the base, the leg including a tube and a rod, the rod movable with respect to the tube, the leg in spaced relationship to the cylinder.

15. The vehicle according to claim 14 wherein the plow assembly includes a plow frame and a moldboard, the plow frame being pivotally mounted to the frame of the hitch assembly, the moldboard being mounted to the plow frame.

16. The vehicle according to claim 15 wherein the moldboard is pivotally mounted to the plow frame.

17. The vehicle according to claim 16 wherein the plow assembly includes a biasing assembly for allowing the moldboard to pivotally move from a plowing position to a displaced position.

18. The vehicle according to claim 17 wherein the biasing assembly is disposed between the moldboard and the plow frame.

19. The vehicle according to claim 14 wherein the frame of the hitch assembly includes a second clamping member, the movable clamping member being adjustable with respect to the second clamping member of the frame to engage the mounting member between the clamping members.

20. The vehicle according to claim 19 wherein each clamping member includes a hook-shaped projection.

21. The vehicle according to claim 14 wherein the hitch assembly includes a second frame, the second frame supporting the mounting member, the second frame mounting the mounting member to the chassis.

22. The vehicle according to claim 21 further comprising:
at least one chassis support member disposed between the second frame and the chassis.

23. The vehicle according to claim 22 wherein each chassis support member comprises a gusset plate and a stiffener.

24. The vehicle according to claim 22 wherein each chassis support member comprises a bracket and a brace.

25. The vehicle according to claim 14 wherein the hitch assembly includes a lift assembly for selectively moving the plow assembly.

26. The vehicle of claim 14 further comprising:
a removable brace for preventing the rotation of the frame of the hitch assembly with respect to the plow assembly in at least one direction.

27. The vehicle of claim 25 further comprising:
a removable brace for preventing the rotation of the frame of the hitch assembly with respect to the plow assembly in at least one direction, the brace being disposable between the plow assembly and the lift assembly.

28. A hitch assembly for mounting a plow to a vehicle comprising:
a vehicle portion for mounting to a vehicle, the vehicle portion including a mounting member having a substantially planar face; and
a plow portion for supporting a plow, the plow portion including a frame and a movable member, the movable member movable with respect to the frame, the movable member including a clamping member, the clamping member being adjustable to engage the mounting member for removably mounting the plow portion to the vehicle portion, wherein the frame of the plow portion includes a second clamping member, the clamping member of the movable member being adjustable with respect to the second clamping member of the frame to engage the mounting member between the clamping members.

29. The hitch assembly according to claim 28 wherein the vehicle portion includes a second frame, the second frame supporting the mounting member.

30. The hitch assembly according to claim 29 wherein the second frame includes a pair of side support members in spaced relationship to each and a pair of transverse support members extending between the side support members.

31. The hitch assembly according to claim 28 wherein the plow portion includes a lift assembly for selectively moving the plow.

32. The hitch assembly according to claim 31 wherein the lift assembly includes a lift arm and a lift cylinder, the lift arm being pivotally mounted to the frame, and the lilt cylinder extending between the lift arm and the frame, the lift cylinder including a movable piston, the lift cylinder operable to selectively move the lift arm.

33. The hitch assembly according to claim 32 wherein the lift arm includes a distal end configured to support the plow.

34. The hitch assembly according to claim 32 further comprising:
a removable brace for engaging the lift arm to prevent rotation thereof in at least one direction.

35. The hitch assembly according to claim 28 wherein the frame of the plow portion includes a pair of side support members in spaced relationship to each other and a plurality of transverse support members.

36. The hitch assembly according to claim 28 wherein the cylinder is pivotally mounted to the frame and the base.

37. The hitch assembly according to claim 28 wherein the leg is pivotally mounted to the frame and the base.

38. The hitch assembly according to claim 28 wherein each clamping member includes a hook-shaped projection.

39. The hitch assembly according to claim 28 wherein the frame of the plow portion includes a plurality of beveled guide gussets.

40. A vehicle comprising:

a chassis;

a body secured to the chassis, the body having a front end;

a plow assembly mounted to the chassis;

a hitch assembly disposed between the plow assembly and the chassis for mounting the plow assembly to the chassis, the hitch assembly including a mounting member mounted to the chassis adjacent the front end of the body, the mounting member including a substantially planar face, a first frame for supporting the plow assembly, the first frame removably mounted to the mounting member, wherein the hitch assembly includes a moveable clamping member movably mounted to the first frame, the first frame being removably mounted to the mounting member via the movable clamping member, and wherein the frame of the hitch assembly includes a second clamping member, the movable clamping member being adjustable with respect to the second clamping member of the first frame to engage the mounting member between the clamping members.

41. The vehicle according to claim 40 wherein the plow assembly includes a plow frame and a moldboard, the plow frame being pivotally mounted to the frame of the hitch assembly, the moldboard being mounted to the plow frame.

42. The vehicle according to claim 41 wherein the moldboard is pivotally mounted to the plow frame.

43. The vehicle according to claim 42 wherein the plow assembly includes a biasing assembly for allowing the moldboard to pivotally move from a plowing position to a displaced position.

44. The vehicle according to claim 43 wherein the biasing assembly is disposed between the moldboard and the plow frame.

45. The vehicle according to claim 40 further comprising:

a second frame, the second frame supporting the mounting member, the second frame mounting the mounting member to the chassis; and at least one chassis support member disposed between the second frame and the chassis.

46. The vehicle according to claim 45 wherein each chassis support member comprises a gusset plate and a stiffener.

47. The vehicle according to claim 45 wherein each chassis support member comprises a bracket and a brace.

48. The vehicle according to claim 40 wherein the hitch assembly includes a lift assembly for selectively moving the plow assembly.

49. The vehicle of claim 40 further comprising:

a removable brace for preventing the rotation of the frame of the hitch assembly with respect to the plow assembly in at least one direction.

50. The vehicle of claim 48 further comprising:

a removable brace for preventing the rotation of the frame of the hitch assembly with respect to the plow assembly in at least one direction, the brace being disposable between the plow assembly and the lift assembly.

* * * * *